(12) United States Patent
Riachentsev et al.

(10) Patent No.: US 11,371,326 B2
(45) Date of Patent: Jun. 28, 2022

(54) DOWNHOLE PUMP WITH SWITCHED RELUCTANCE MOTOR

(71) Applicant: Saudi Arabian Oil Company, Dhahran (SA)

(72) Inventors: Val Riachentsev, Houston, TX (US); Jinjiang Xiao, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 16 days.

(21) Appl. No.: 16/889,375

(22) Filed: Jun. 1, 2020

(65) Prior Publication Data
US 2021/0372244 A1    Dec. 2, 2021

(51) Int. Cl.
| | |
|---|---|
| *E21B 43/12* | (2006.01) |
| *F04D 13/10* | (2006.01) |
| *E21B 34/06* | (2006.01) |
| *F04D 1/06* | (2006.01) |
| *F04D 7/02* | (2006.01) |
| *F04D 13/08* | (2006.01) |
| *H02K 7/14* | (2006.01) |
| *H02K 37/04* | (2006.01) |
| *H02K 37/24* | (2006.01) |

(52) U.S. Cl.
CPC ............ *E21B 43/128* (2013.01); *E21B 34/06* (2013.01); *F04D 1/06* (2013.01); *F04D 7/02* (2013.01); *F04D 13/086* (2013.01); *F04D 13/10* (2013.01); *H02K 7/14* (2013.01); *H02K 37/04* (2013.01); *H02K 37/24* (2013.01)

(58) Field of Classification Search
CPC .... E21B 23/0419; E21B 43/128; E21B 43/13; F04D 13/086; F04D 13/10
See application file for complete search history.

(56) References Cited

U.S. PATENT DOCUMENTS

| | | |
|---|---|---|
| 335,164 A | 2/1886 | Vitalis |
| 646,887 A | 4/1900 | Stowe et al. |
| 1,559,155 A | 10/1925 | Bullock |
| 1,912,452 A | 6/1933 | Hollander |
| 1,978,277 A | 10/1934 | Noble |
| 2,287,027 A | 6/1942 | Cummins |
| 2,556,435 A | 6/1951 | Moehrl |

(Continued)

FOREIGN PATENT DOCUMENTS

| | | |
|---|---|---|
| CA | 1226325 | 9/1987 |
| CA | 2629578 | 10/2009 |

(Continued)

OTHER PUBLICATIONS

Abelsson et al., "Development and Testing of a Hybrid Boosting Pump," OTC 21516, Offshore Technology Conference, presented at the Offshore Technology Conference, May 2-5, 2011, 9 pages.

(Continued)

*Primary Examiner* — Cathleen R Hutchins
(74) *Attorney, Agent, or Firm* — Fish & Richardson P.C.

(57) ABSTRACT

A motorized pump system includes a switched reluctance motor with a motor rotor and a motor stator, and a pump surrounding the switched reluctance motor. The motor rotor is positioned radially inward or outward of the motor stator, and the pump includes a pump rotor integrated with the motor rotor. The pump rotor includes at least one impeller connected to the motor rotor.

24 Claims, 7 Drawing Sheets

(56) References Cited

U.S. PATENT DOCUMENTS

| | | |
|---|---|---|
| 2,625,110 A | 1/1953 | Haentjens et al. |
| 2,641,191 A | 6/1953 | Alfred |
| 2,782,720 A | 2/1957 | Dochterman |
| 2,866,417 A | 12/1958 | Otto |
| 3,007,418 A | 11/1961 | Brundage et al. |
| 3,034,484 A | 5/1962 | Stefancin |
| 3,123,010 A | 3/1964 | Witt et al. |
| 3,129,875 A | 4/1964 | Cirillo |
| 3,132,595 A | 5/1964 | Bower |
| 3,139,835 A | 7/1964 | Wilkinson |
| 3,171,355 A | 3/1965 | Harris et al. |
| 3,175,403 A | 3/1965 | Nelson |
| 3,251,226 A | 5/1966 | Cushing |
| 3,272,130 A | 9/1966 | Mosbacher |
| 3,413,925 A | 12/1968 | Campolong |
| 3,516,765 A | 6/1970 | Boyadjieff |
| 3,638,732 A | 2/1972 | Huntsinger et al. |
| 3,680,989 A | 8/1972 | Brundage |
| 3,724,503 A | 4/1973 | Cooke |
| 3,771,910 A | 11/1973 | Laing |
| 3,795,145 A | 3/1974 | Miller |
| 3,839,914 A | 10/1974 | Modisette et al. |
| 3,874,812 A | 4/1975 | Hanagarth |
| 3,961,758 A | 6/1976 | Morgan |
| 3,975,117 A | 8/1976 | Carter |
| 4,025,244 A | 5/1977 | Sato |
| 4,096,211 A | 6/1978 | Rameau |
| 4,154,302 A | 5/1979 | Cugini |
| 4,181,175 A | 1/1980 | McGee et al. |
| 4,226,275 A | 10/1980 | Frosch |
| 4,266,607 A | 5/1981 | Halstead |
| 4,289,199 A | 9/1981 | McGee |
| 4,336,415 A | 6/1982 | Walling |
| 4,374,530 A | 2/1983 | Walling |
| 4,387,685 A | 6/1983 | Abbey |
| 4,417,474 A | 11/1983 | Elderton |
| 4,476,923 A | 10/1984 | Walling |
| 4,491,176 A | 1/1985 | Reed |
| 4,497,185 A | 2/1985 | Shaw |
| 4,576,043 A | 3/1986 | Nguyen |
| 4,580,634 A | 4/1986 | Cruise |
| 4,582,131 A | 4/1986 | Plummer et al. |
| 4,586,854 A | 5/1986 | Newman et al. |
| 4,619,323 A | 10/1986 | Gidley |
| 4,627,489 A | 12/1986 | Reed |
| 4,658,583 A | 4/1987 | Shropshire |
| 4,662,437 A | 5/1987 | Renfro |
| 4,665,981 A | 5/1987 | Hayatdavoudi |
| 4,741,668 A | 5/1988 | Bearden et al. |
| 4,757,709 A | 7/1988 | Czernichow |
| RE32,866 E | 2/1989 | Cruise |
| 4,838,758 A | 6/1989 | Sheth |
| 4,850,812 A | 7/1989 | Voight |
| 4,856,344 A | 8/1989 | Hunt |
| 4,867,633 A | 9/1989 | Gravelle |
| 4,969,364 A | 11/1990 | Masuda |
| 4,986,739 A | 1/1991 | Child |
| 5,033,937 A | 7/1991 | Wilson |
| 5,158,440 A | 10/1992 | Cooper et al. |
| 5,180,014 A | 1/1993 | Cox |
| 5,195,882 A | 3/1993 | Freeman |
| 5,201,848 A | 4/1993 | Powers |
| 5,209,650 A | 5/1993 | Lemieux |
| 5,261,796 A | 11/1993 | Niemiec et al. |
| 5,269,377 A | 12/1993 | Martin |
| 5,285,008 A | 2/1994 | Sas-Jaworsky et al. |
| 5,323,661 A | 6/1994 | Cheng |
| 5,334,801 A | 8/1994 | Mohn |
| 5,335,542 A | 8/1994 | Ramakrishnan et al. |
| 5,337,603 A | 8/1994 | McFarland et al. |
| 5,358,378 A | 10/1994 | Holscher |
| 5,482,117 A | 1/1996 | Kolpak |
| 5,494,413 A | 2/1996 | Campen et al. |
| 5,591,922 A | 1/1997 | Segeral et al. |
| 5,605,193 A | 2/1997 | Bearden et al. |
| 5,620,048 A | 4/1997 | Beauquin |
| 5,641,915 A | 6/1997 | Ortiz |
| 5,649,811 A | 7/1997 | Krol, Jr. et al. |
| 5,653,585 A | 8/1997 | Fresco et al. |
| 5,693,891 A | 12/1997 | Brown |
| 5,736,650 A | 4/1998 | Hiron et al. |
| 5,755,288 A | 5/1998 | Bearden et al. |
| 5,834,659 A | 11/1998 | Ortiz |
| 5,845,709 A | 12/1998 | Mack et al. |
| 5,848,642 A | 12/1998 | Sola |
| 5,880,378 A | 3/1999 | Behring |
| 5,886,267 A | 3/1999 | Ortiz et al. |
| 5,905,208 A | 5/1999 | Ortiz et al. |
| 5,908,049 A | 6/1999 | Williams et al. |
| 5,921,285 A | 7/1999 | Quigley et al. |
| 5,939,813 A * | 8/1999 | Schob ............... H02K 7/09 310/425 |
| 5,954,305 A | 9/1999 | Calabro |
| 6,113,675 A | 9/2000 | Branstetter |
| 6,129,507 A | 10/2000 | Ganelin |
| 6,148,866 A | 11/2000 | Quigley et al. |
| 6,155,102 A | 12/2000 | Toma |
| 6,164,308 A | 12/2000 | Butler |
| 6,167,965 B1 | 1/2001 | Bearden et al. |
| 6,176,323 B1 | 1/2001 | Weirich |
| 6,179,269 B1 | 1/2001 | Kobylinski et al. |
| 6,192,983 B1 | 2/2001 | Neuroth et al. |
| 6,257,332 B1 | 7/2001 | Vidrine et al. |
| 6,264,440 B1 | 7/2001 | Klein et al. |
| 6,286,558 B1 | 9/2001 | Quigley et al. |
| 6,298,917 B1 | 10/2001 | Kobylinski et al. |
| 6,325,143 B1 | 12/2001 | Scarsdale |
| 6,357,485 B2 | 3/2002 | Quigley et al. |
| 6,361,272 B1 | 3/2002 | Bassett |
| 6,413,065 B1 | 7/2002 | Dass |
| 6,414,239 B1 | 7/2002 | Gasque, Jr. |
| 6,454,010 B1 | 9/2002 | Thomas et al. |
| 6,463,810 B1 | 10/2002 | Liu |
| 6,530,211 B2 | 3/2003 | Holtzapple et al. |
| 6,544,013 B2 | 4/2003 | Kato et al. |
| 6,546,812 B2 | 4/2003 | Lewis |
| 6,550,327 B1 | 4/2003 | Van Berk |
| 6,557,642 B2 | 5/2003 | Head |
| 6,601,460 B1 | 8/2003 | Matema |
| 6,601,651 B2 | 8/2003 | Grant |
| 6,604,550 B2 | 8/2003 | Quigley et al. |
| 6,629,564 B1 | 10/2003 | Ramakrishnan et al. |
| 6,679,692 B1 | 1/2004 | Feuling et al. |
| 6,681,894 B1 | 1/2004 | Fanguy |
| 6,726,449 B2 | 4/2004 | James et al. |
| 6,733,249 B2 | 5/2004 | Maier et al. |
| 6,741,000 B2 | 5/2004 | Newcomb |
| 6,776,054 B1 | 8/2004 | Stephenson |
| 6,807,857 B2 | 10/2004 | Storm, Jr. |
| 6,808,371 B2 | 10/2004 | Niwatsukino et al. |
| 6,811,382 B2 | 11/2004 | Buchanan et al. |
| 6,848,539 B2 | 2/2005 | Lee et al. |
| 6,856,132 B2 | 2/2005 | Appel et al. |
| 6,857,452 B2 | 2/2005 | Quigley et al. |
| 6,863,137 B2 | 3/2005 | Terry et al. |
| 6,935,189 B2 | 8/2005 | Richards |
| 6,993,979 B2 | 2/2006 | Segeral |
| 7,017,681 B2 | 3/2006 | Ivannikov et al. |
| 7,021,905 B2 | 4/2006 | Torrey et al. |
| 7,032,662 B2 | 4/2006 | Malone et al. |
| 7,086,294 B2 | 8/2006 | DeLong |
| 7,093,665 B2 | 8/2006 | Dass |
| 7,107,860 B2 | 9/2006 | Jones |
| 7,226,279 B2 | 6/2007 | Andoskin et al. |
| 7,259,688 B2 | 8/2007 | Hirsch et al. |
| 7,262,532 B2 | 8/2007 | Seidler et al. |
| 7,275,592 B2 | 10/2007 | Davis |
| 7,338,262 B2 | 3/2008 | Gozdawa |
| 7,377,312 B2 | 5/2008 | Davis |
| 7,647,948 B2 | 1/2010 | Quigley et al. |
| 7,670,122 B2 | 3/2010 | Phillips et al. |
| 7,670,451 B2 | 3/2010 | Head |
| 7,699,099 B2 | 4/2010 | Bolding et al. |
| 7,762,715 B2 | 7/2010 | Gordon et al. |

(56) References Cited

U.S. PATENT DOCUMENTS

| | | |
|---|---|---|
| 7,770,650 B2 | 8/2010 | Young et al. |
| 7,775,763 B1 | 8/2010 | Johnson et al. |
| 7,819,640 B2 | 10/2010 | Kalavsky et al. |
| 7,841,395 B2 | 11/2010 | Gay et al. |
| 7,841,826 B1 | 11/2010 | Phillips |
| 7,849,928 B2 | 12/2010 | Collie |
| 7,905,295 B2 | 3/2011 | Mack |
| 8,013,660 B2 | 9/2011 | Fitzi |
| 8,016,545 B2 | 9/2011 | Oklejas et al. |
| 8,066,033 B2 | 11/2011 | Quigley et al. |
| 8,067,865 B2 | 11/2011 | Savant |
| 8,197,602 B2 | 6/2012 | Baron |
| 8,235,126 B2 | 8/2012 | Bradley |
| 8,261,841 B2 | 9/2012 | Bailey et al. |
| 8,302,736 B1 | 11/2012 | Olivier |
| 8,337,142 B2 | 12/2012 | Eslinger et al. |
| 8,419,398 B2 | 4/2013 | Kothnur et al. |
| 8,568,081 B2 | 10/2013 | Song et al. |
| 8,579,617 B2 | 11/2013 | Ono et al. |
| 8,771,499 B2 | 7/2014 | McCutchen et al. |
| 8,821,138 B2 | 9/2014 | Holtzapple et al. |
| 8,905,728 B2 | 12/2014 | Blankemeier et al. |
| 8,936,430 B2 | 1/2015 | Bassett |
| 8,960,309 B2 | 2/2015 | Davis |
| 8,973,433 B2 | 3/2015 | Mulford |
| 9,080,336 B1 | 7/2015 | Yantis |
| 9,133,709 B2 | 9/2015 | Huh et al. |
| 9,200,932 B2 | 12/2015 | Sittier |
| 9,203,277 B2 | 12/2015 | Kori et al. |
| 9,234,529 B2 | 1/2016 | Meuter |
| 9,383,476 B2 | 7/2016 | Trehan |
| 9,500,073 B2 | 11/2016 | Alan et al. |
| 9,540,908 B1 | 1/2017 | Olivier |
| 9,574,438 B2 | 2/2017 | Flores |
| 9,593,561 B2 | 3/2017 | Xiao et al. |
| 9,677,560 B1 | 6/2017 | Davis et al. |
| 9,759,025 B2 | 9/2017 | Vavik |
| 9,915,134 B2 | 3/2018 | Xiao et al. |
| 9,932,806 B2 | 4/2018 | Stewart |
| 9,964,533 B2 | 5/2018 | Ahmad |
| 9,982,519 B2 | 5/2018 | Melo |
| 10,273,399 B2 | 4/2019 | Cox et al. |
| 10,287,853 B2 | 5/2019 | Ejim |
| 10,308,865 B2 | 6/2019 | Cox et al. |
| 10,323,644 B1 | 6/2019 | Shakirov et al. |
| 10,487,259 B2 | 11/2019 | Cox et al. |
| 10,501,682 B2 | 12/2019 | Cox et al. |
| 2002/0074742 A1 | 6/2002 | Quoiani |
| 2002/0079100 A1 | 6/2002 | Simpson |
| 2002/0109080 A1 | 8/2002 | Tubel et al. |
| 2002/0121376 A1 | 9/2002 | Rivas |
| 2002/0153141 A1 | 10/2002 | Hartman |
| 2003/0141071 A1 | 7/2003 | Hosie |
| 2003/0161739 A1 | 8/2003 | Chu et al. |
| 2003/0226395 A1 | 12/2003 | Storm et al. |
| 2004/0013547 A1* | 1/2004 | Allen .................. F04D 3/00 417/423.1 |
| 2004/0060705 A1 | 4/2004 | Kelley |
| 2005/0098349 A1 | 5/2005 | Krueger et al. |
| 2005/0166961 A1 | 8/2005 | Means |
| 2005/0217859 A1 | 10/2005 | Hartman |
| 2006/0076956 A1 | 4/2006 | Sjolie et al. |
| 2006/0096760 A1 | 5/2006 | Ohmer |
| 2007/0193749 A1 | 8/2007 | Folk |
| 2008/0093084 A1 | 4/2008 | Knight |
| 2008/0187434 A1 | 8/2008 | Neiszer |
| 2008/0236842 A1 | 10/2008 | Bhavsar et al. |
| 2008/0262737 A1 | 10/2008 | Thigpen et al. |
| 2008/0264182 A1 | 10/2008 | Jones |
| 2008/0290876 A1 | 11/2008 | Ameen |
| 2008/0292454 A1 | 11/2008 | Brunner |
| 2009/0016899 A1 | 1/2009 | Davis |
| 2009/0090513 A1 | 4/2009 | Bissonnette |
| 2009/0110579 A1 | 4/2009 | Amburgey |
| 2009/0151928 A1 | 6/2009 | Lawson |
| 2009/0151953 A1 | 6/2009 | Brown |
| 2009/0255669 A1 | 10/2009 | Ayan et al. |
| 2009/0289627 A1 | 11/2009 | Johansen et al. |
| 2009/0293634 A1 | 12/2009 | Ong |
| 2010/0040492 A1 | 2/2010 | Eslinger et al. |
| 2010/0122818 A1 | 5/2010 | Rooks |
| 2010/0206577 A1 | 8/2010 | Martinez |
| 2010/0236794 A1 | 9/2010 | Duan |
| 2010/0244404 A1 | 9/2010 | Bradley |
| 2010/0258306 A1 | 10/2010 | Camilleri |
| 2010/0288493 A1 | 11/2010 | Fielder et al. |
| 2010/0300413 A1 | 12/2010 | Ulrey et al. |
| 2011/0017459 A1 | 1/2011 | Dinkins |
| 2011/0024107 A1 | 2/2011 | Sunyovszky et al. |
| 2011/0024231 A1 | 2/2011 | Wurth et al. |
| 2011/0036568 A1 | 2/2011 | Barbosa |
| 2011/0036662 A1 | 2/2011 | Smith |
| 2011/0155390 A1 | 6/2011 | Lannom et al. |
| 2011/0162832 A1 | 7/2011 | Reid |
| 2011/0185805 A1 | 8/2011 | Roux et al. |
| 2011/0203848 A1 | 8/2011 | Krueger et al. |
| 2011/0278094 A1 | 11/2011 | Gute |
| 2011/0296911 A1 | 12/2011 | Moore |
| 2011/0300008 A1 | 12/2011 | Fielder et al. |
| 2012/0282119 A1 | 11/2012 | Floyd |
| 2013/0019673 A1 | 1/2013 | Sroka |
| 2013/0300833 A1 | 1/2013 | Perkins |
| 2013/0068454 A1 | 3/2013 | Armistead |
| 2013/0073208 A1 | 3/2013 | Dorovsky |
| 2013/0081460 A1 | 4/2013 | Xiao et al. |
| 2013/0175030 A1 | 7/2013 | Ige |
| 2013/0189123 A1 | 7/2013 | Stokley |
| 2013/0213663 A1 | 8/2013 | Lau et al. |
| 2013/0248429 A1 | 9/2013 | Dahule |
| 2013/0255370 A1 | 10/2013 | Roux et al. |
| 2013/0259721 A1 | 10/2013 | Noui-Mehidi |
| 2014/0012507 A1 | 1/2014 | Trehan |
| 2014/0014331 A1 | 1/2014 | Crocker |
| 2014/0027546 A1 | 1/2014 | Kean et al. |
| 2014/0037422 A1 | 2/2014 | Gilarranz |
| 2014/0041862 A1 | 2/2014 | Ersoz |
| 2014/0209291 A1 | 7/2014 | Watson |
| 2014/0265337 A1 | 9/2014 | Harding et al. |
| 2014/0343857 A1 | 11/2014 | Pfutzner |
| 2014/0377080 A1 | 12/2014 | Xiao et al. |
| 2015/0068769 A1 | 3/2015 | Xiao et al. |
| 2015/0071795 A1 | 3/2015 | Vazquez et al. |
| 2015/0192141 A1 | 7/2015 | Nowitzki et al. |
| 2015/0233228 A1 | 8/2015 | Roth |
| 2015/0308245 A1 | 10/2015 | Stewart et al. |
| 2015/0308444 A1 | 10/2015 | Trottman |
| 2015/0330194 A1 | 11/2015 | June et al. |
| 2015/0354308 A1 | 12/2015 | June et al. |
| 2015/0354590 A1 | 12/2015 | Kao |
| 2015/0376907 A1 | 12/2015 | Nguyen |
| 2016/0010451 A1 | 1/2016 | Melo |
| 2016/0016834 A1 | 1/2016 | Dahule |
| 2016/0169231 A1* | 6/2016 | Michelassi ............ F04D 29/061 417/423.7 |
| 2016/0305447 A1 | 10/2016 | Dreiss et al. |
| 2016/0332856 A1 | 11/2016 | Steedley |
| 2017/0012491 A1 | 1/2017 | Schob et al. |
| 2017/0058664 A1 | 3/2017 | Xiao et al. |
| 2017/0074082 A1 | 3/2017 | Palmer |
| 2017/0122046 A1 | 5/2017 | Vavik |
| 2017/0138189 A1 | 5/2017 | Ahmad et al. |
| 2017/0159668 A1 | 6/2017 | Nowitzki et al. |
| 2017/0167498 A1 | 6/2017 | Chang |
| 2017/0175752 A1 | 6/2017 | Hofer et al. |
| 2017/0183942 A1 | 6/2017 | Veland |
| 2017/0194831 A1 | 7/2017 | Marvel |
| 2017/0292533 A1 | 10/2017 | Zia |
| 2017/0321695 A1 | 11/2017 | Head |
| 2017/0328151 A1 | 11/2017 | Dillard |
| 2018/0058157 A1 | 3/2018 | Melo et al. |
| 2018/0171767 A1 | 6/2018 | Huynh et al. |
| 2018/0226174 A1 | 8/2018 | Rose |
| 2018/0238152 A1 | 8/2018 | Melo |
| 2018/0306199 A1 | 10/2018 | Reed |

(56) References Cited

U.S. PATENT DOCUMENTS

| | | |
|---|---|---|
| 2018/0320059 A1 | 11/2018 | Cox et al. |
| 2018/0340389 A1 | 11/2018 | Wang |
| 2018/0363660 A1 | 12/2018 | Klahn |
| 2019/0032667 A1 | 1/2019 | Ifrim et al. |
| 2019/0040863 A1 | 2/2019 | Davis et al. |
| 2019/0271217 A1 | 9/2019 | Radov et al. |
| 2020/0018317 A1 | 1/2020 | Landi et al. |
| 2020/0056462 A1 | 2/2020 | Xiao et al. |
| 2020/0056615 A1 | 2/2020 | Xiao et al. |

FOREIGN PATENT DOCUMENTS

| | | |
|---|---|---|
| CN | 2168104 | 6/1994 |
| CN | 1507531 | 6/2004 |
| CN | 101328769 | 12/2008 |
| CN | 101842547 | 9/2010 |
| CN | 203420906 | 2/2014 |
| CN | 104533797 | 4/2015 |
| CN | 105239963 | 1/2016 |
| CN | 103717901 | 6/2016 |
| DE | 3444859 | 6/1985 |
| DE | 3520884 | 1/1986 |
| DE | 102008001607 | 11/2009 |
| DE | 102012215023 | 1/2014 |
| DE | 102012022453 | 5/2014 |
| DE | 102013200450 | 7/2014 |
| DE | 102012205757 | 8/2014 |
| EP | 0579981 | 1/1994 |
| EP | 0637675 | 2/1995 |
| EP | 1101024 | 5/2001 |
| EP | 1143104 | 10/2001 |
| EP | 1270900 | 1/2003 |
| EP | 1369588 | 12/2003 |
| EP | 2801696 | 12/2014 |
| EP | 2893301 | 5/2018 |
| EP | 3527830 | 8/2019 |
| GB | 670206 | 4/1952 |
| GB | 2173034 | 10/1986 |
| GB | 2226776 | 7/1990 |
| GB | 2283035 | 4/1995 |
| GB | 2348674 | 10/2000 |
| GB | 2504104 | 1/2014 |
| JP | 4019375 | 1/1992 |
| JP | 2013110910 | 6/2013 |
| RU | 122531 | 11/2012 |
| WO | WO 1995004869 | 2/1995 |
| WO | WO 1998046857 | 10/1998 |
| WO | WO 1999027256 | 6/1999 |
| WO | WO 2002072998 | 9/2002 |
| WO | WO 2005066502 | 7/2005 |
| WO | WO 2009129607 | 10/2009 |
| WO | WO 2011066050 | 6/2011 |
| WO | WO 2011101296 | 8/2011 |
| WO | WO 2011133620 | 10/2011 |
| WO | WO 2011135541 | 11/2011 |
| WO | WO 2012058290 | 5/2012 |
| WO | WO 2013171053 | 11/2013 |
| WO | WO 2014127035 | 8/2014 |
| WO | WO 2014147645 | 9/2014 |
| WO | WO 2015034482 | 3/2015 |
| WO | WO 2015041655 | 3/2015 |
| WO | WO 2015084926 | 6/2015 |
| WO | WO 2015123236 | 8/2015 |
| WO | WO 2016003662 | 1/2016 |
| WO | WO 2016012245 | 1/2016 |
| WO | WO 2016081389 | 5/2016 |
| WO | WO 2016089526 | 6/2016 |
| WO | WO 2016160016 | 10/2016 |
| WO | WO 2016195643 | 12/2016 |
| WO | WO 2017021553 | 2/2017 |
| WO | WO 2018022198 | 2/2018 |
| WO | WO 2019243789 | 12/2019 |

OTHER PUBLICATIONS

Alhanati et al., "ESP Failures: Can we talk the same language?" SPE paper, SPE ESP Workshop held in Houston, Apr. 25-27, 2001, 11 page.

Alhasan et al., "Extending mature field production life using a multiphase twin screw pump," BHR Group Multiphase 15, 2011, 11 pages.

Baker Hughes, "Multiphase Pump: Increases Efficiency and Production in Wells with High Gas Content," Brochure overview, retrieved from URL <https://assets.www.bakerhughes.com/system/69/00d970d9dd11e3a411ddf3c1325ea6/28592.MVP_Overview.pdf>, 2014, 2 pages.

Blunt, "Effects of heterogeneity and wetting on relative permeability using pore level modeling," SPE 36762, Society of Petroleum Engineers (SPE), SPE Journal 2:01 (70-87), Mar. 1997, 19 pages.

Bryant and Blunt, "Prediction of relative permeability in simple porous media," Physical Review A 46:4, Aug. 1992, 8 pages.

Champion et al., "The application of high-power sound waves for wellbore cleaning," SPE 82197, Society of Petroleum Engineers International (SPE), presented at the SPE European Formation Damage Conference, May 13-14, 2003, 10 pages.

Chappell and Lancaster, "Comparison of methodological uncertainties within permeability measurements," Wiley InterScience, Hydrological Processes 21:18 (2504-2514), Jan. 2007, 11 pages.

Cramer et al., "Development and Application of a Downhole Chemical Injection Pump for Use in ESP Applications," SPE 14403, Society of Petroleum Engineers (SPE), presented at the 66th Annual Technical Conference and Exhibition, Sep. 22-25, 1985, 6 page.

Danfoss, "Facts Worth Knowing about Frequency Converters," Handbook VLT Frequency Converters, Danfoss Engineering Tomorrow, 180 pages.

DiCarlo et al., "Three-phase relative permeability of water-wet, oil-wet, and mixed-wet sandpacks," SPE 60767, Society of Petroleum Engineers (SPE), presented at the 1998 SPE Annual Technical Conference and Exhibition, Sep. 27-30, 1998, SPE Journal 5:01 (82-91), Mar. 2000, 10 pages.

Dixit et al., "A pore-level investigation of relative permeability hysteresis in water-wet systems," SPE 37233, Society of Petroleum Engineers (SPE), presented at the 1997 SPE International Symposium on Oilfield Chemistry, Feb. 18-21, 1997, SPE Journal 3:02 (115-123), Jun. 1998, 9 pages.

ejprescott.com (online), "Water, Sewer and Drain Fittings B-22, Flange Adaptors," retrieved from URL <https://www.ejprescott.com/media/reference/FlangeAdaptorsB-22.pdf> retrieved on Jun. 15, 2020, available on or before Nov. 2010 via wayback machine URL <http://web.archive.org/web/20101128181255/https://www.ejprescott.com/media/reference/FlangeAdaptorsB-22.pdf>, 5 pages.

Fatt, "The network model of porous media," Spe 574-G, I. Capillary Pressure Characteristics, AIME Petroleum Transactions 207: 144-181, Dec. 1956, 38 pages.

Geary et al., "Downhole Pressure Boosting in Natural Gas Wells: Results from Prototype Testing," SPE 11406, Society of Petroleum Engineers International (SPE), presented at the SPE Asia Pacific Oil and Gas Conference and Exhibition, Oct. 20-22, 2008, 13 pages.

Godbole et al., "Axial Thrust in Centrifugal Pumps—Experimental Analysis," Paper Ref: 2977, presented at the 15th International Conference on Experimental Mechanics, ICEM15, Jul. 22-27, 2012, 14 pages.

Heiba et al., "Percolation theory of two-phase relative permeability," SPE Reservoir Engineering 7:01 (123-132), Feb. 1992, 11 pages.

Hua et al., "Comparison of Multiphase Pumping Techniques for Subsea and Downhole Applications," SPE 146784, Society of Petroleum Engineers International (SPE), presented at the SPE Annual Technical Conference and Exhibition, Oct. 30-Nov. 2, 2011, Oil and Gas Facilities, Feb. 2012, 11 pages.

Hui and Blunt, "Effects of wettability on three-phase flow in porous media" American Chemical Society (ACS), J. Phys. Chem. 104 :16 (3833-3845), Feb. 2000, 13 pages.

Krag et al., "Preventing Scale Deposition Downhole Using High Frequency Electromagnetic AC Signals from Surface Enhance Production Offshore Denmark," SPE-170898-MS, Society of Petro-

(56) References Cited

OTHER PUBLICATIONS leum Engineers International (SPE), presented at the SPE Annual Technical Conference and Exhibition, Oct. 27-29, 2014, 10 pages.
laserfocusworld.com (online), "High-Power Lasers: Fiber lasers drill for oil," Dec. 5, 2012, retrieved on May 31, 2018, retrieved from URL: <https://www.laserfocusworld.com/articles/print/volume-48/issue-12/world-news/high-power-lasers-fiber-lasers-drill-for-oil.html>, 4 pages.
Li et al., "In Situ Estimation of Relative Permeability from Resistivity Measurements," EAGE/The Geological Society of London, Petroleum Geoscience 20: 143-151, 2014, 10 pages.
machinedesign.com [online], Frances Richards, "Motors for efficiency: Permanent-magnet, reluctance, and induction motors compared," Apr. 2013, retrieved on Nov. 11, 2020, retrieved from URL <https://www.machinedesign.com/motors-drives/article/21832406/motors-for-efficiency-permanentmagnet-reluctance-and-induction-motors-compared>.
Mahmud et al., "Effect of network topology on two-phase imbibition relative permeability," Transport in Porous Media 66:3 (481-493), Feb. 2007, 14 pages.
Mirza, "The Next Generation of Progressive Cavity Multiphase Pumps use a Novel Design Concept for Superior Performance and Wet Gas Compression," Flow Loop Testing, BHR Group, 2007, 9 pages.
Mirza, "Three Generations of Multiphase Progressive Cavity Pumping," Cahaba Media Group, Upstream Pumping Solutions, Winter 2012, 6 pages.
Muswar et al., "Physical Water Treatment in the Oil Field Results from Indonesia," SPE 113526, Society of Petroleum Engineers International (SPE), presented at the SPE Asia Pacific Oil and Gas Conference and Exhibition, Oct. 18-20, 2010, 11 pages.
Nagy et al., "Comparison of permeability testing methods," Proceedings of the 18th International Conference on Soil Mechanics and Geotechnical Engineering 399-402, 2013, 4 pages.
Parker, "About Gerotors," Parker Haffinfin Corp, 2008, 2 pages.
Purcell, "Capillary pressures—their measurement using mercury and the calculation of permeability therefrom," Petroleum Transactions, AIME, presented at the Branch Fall Meeting, Oct. 4-6, 1948, Journal of Petroleum Technology 1:02 (39-48), Feb. 1949, 10 pages.
Rzeznik et al., "Two Year Results of a Breakthrough Physical Water Treating System for the Control of Scale in Oilfield Applications," SPE114072, Society of Petroleum Engineers International (SPE), presented at the 2008 SPE International Oilfield Scale Conference, May 28-29, 2008, 11 pages.
Schlumberger, "AGH: Advanced Gas-Handling Device," Product Sheet, retrieved from URL: <http://www.slb.com/~/media/Files/artificial_lift/product_sheets/ESPs/advanced_gas_handling_ps.pdf>. Jan. 2014, 2 pages.
Schöneberg, "Wet Gas Compression with Twin Screw Pumps," Bornemann Pumps, Calgary Pump Symposium 2005, 50 pages.
Simpson et al., "A Touch, Truly Multiphase Downhole Pump for Unconventional Wells," SPE-185152-MS, Society of Petroleum Engineers (SPE), presented at the SPE Electric Submersible Pump Symposium, the Woodlands, Texas, Apr. 24-28, 2017, 20 pages.
Sulzer Technical Review, "Pushing the Boundaries of Centrifugal Pump Design," Oil and Gas, Jan. 2014, 2 pages.
tm4.com' [online], "Outer rotor for greater performance," available on or before Dec. 5, 2017, via internet archive: Wayback Machine URL <https://web.archive.org/web/20171205163856/https://www.tm4.com/technology/electric-motors/external-rotor-motor-technology/>, retrieved on May 17, 2017, retrieved from URL <https://www.tm4.com/technology/electric-motors/extemal-rotor-motor-technology/>, 2 pages.
Wylde et al., "Deep Downhole Chemical Injection on BP-Operated Miller: Experience and Learning," SPE 92832, Society of Petroleum Engineers (SPE), presented at the 2005 SPE International Symposium on Oilfield Chemistry, May 11-12, 2005, SPE Production & Operations, May 2006, 6 pages.
Xiao et al., "Induction Versus Permanent Magnet Motors for ESP Applications," SPE-192177-MS, Society of Petroleum Engineers (SPE), presented at the SPE Kingdom of Saudi Arabia Annual Technical Symposium and Exhibition, Apr. 23-26, 2018, 15 pages.
Zhan et al., "Characterization of Reservoir Heterogeneity Through Fluid Movement Monitoring with Deep Electromagnetic and Pressure Measurements," SPE 116328, Society of Petroleum Engineers International (SPE), presented at the 2008 SPE Annual Technical Conference and Exhibition, Sep. 21-24, 2008, 16 pages.
PCT International Search Report and Written Opinion in International Appln. No. PCT/US2021/034855, dated Sep. 13, 2021, 15 pages.

\* cited by examiner

DOWNHOLE PUMP WITH SWITCHED RELUCTANCE MOTOR

TECHNICAL FIELD

This disclosure relates to a downhole pump integrated with a motor.

BACKGROUND

A pumping apparatus can include a hydraulic pump and electric motor as two separate components coupled via a rotating shaft. Pumps may be positive-displacement such as hydrostatic, gear, screw, etc., or non-positive-displacement such as hydrodynamic, centrifugal, propeller, etc., or a combination of these. A pump is typically associated with an electric motor. Electric motors can be powered by direct current (DC) sources, such as from batteries, motor vehicles, or rectifiers, or by alternating current (AC) sources, such as a power grid, inverters, or generators.

An electrical motor may operate through interaction of the motor magnetic field with motor winding currents to generate force. The motor may include a motor stator and a motor rotor. The term "stator" is derived from the word stationary, and includes electric coils. The stator may be a stationary electrical component having a group of individual electromagnets arranged in such a way to form a hollow cylinder (for an external stator), with every pole of each magnet facing toward the center of the group. The term "rotor" is derived from the word rotating. The rotor is the rotating electrical component, and includes magnetic materials, such as transformer steel, with the poles facing toward the stator poles. The rotor may be located inside the stator and mounted on the motor shaft. The stator makes the rotor rotate which in turn may rotate the motor shaft. This rotation may occur because of the magnetic phenomenon when magnetic poles attract each other.

Thus, the motor rotor may be a moving component of the electromagnetic system in the electric motor. In particular, the interaction between the windings and magnetic fields produces a torque around the axis of the motor rotor to rotate the motor rotor. This force may rotate the shaft that couples the motor with the discrete pump.

SUMMARY

This disclosure describes motorized pump systems with a motor integrated with a pump.

In some aspects, a motorized pump system includes a switched reluctance motor including a motor rotor and a motor stator, with the motor rotor positioned radially outward of the motor stator, and a pump surrounding the switched reluctance motor. The pump includes a pump rotor integrated with the motor rotor, and the pump rotor includes at least one impeller connected to the motor rotor.

This, and other aspects, can include one or more of the following features. The motor rotor can include rotor poles, the motor stator can include stator poles, and the rotor poles can be positioned radially outward of the stator poles. Spaces between the rotor poles can define at least part of a fluid flow channel through the pump. The motorized pump system can include a longitudinal shaft positioned at a center of the motor stator, where the motor stator is coupled to the longitudinal shaft and configured to be substantially stationary during operation of the switched reluctance motor. The motorized pump system can include a longitudinal bore at a center of the motor stator. The motorized pump system can include a check valve in the longitudinal bore, the check valve to control fluid flow through the longitudinal bore. The motorized pump system can further include a housing radially enclosing the pump, and the pump can include at least one diffuser positioned adjacent the at least one impeller. The at least one diffuser can be fixedly coupled to the housing. The pump can be a multistage centrifugal pump including multiple stages, where each stage includes an impeller of the at least one impeller and a paired diffuser of the at least one diffuser. The motorized pump system can include a motor controller with power electronics to control operation of the switched reluctance motor. The at least one impeller can include a first input impeller and a second output impeller, where the first input impeller is coupled to the motor rotor. The first input impeller can impart a first pressure differential to a fluid flow through the pump, and the second output impeller can impart a second, different pressure differential to the fluid flow. The first input impeller and the second output impeller can provide a symmetrical load on the motor rotor. The motor rotor can include magnetic material and can be free from permanent magnets, copper bars, and windings adjacent the motor stator. The motor rotor can include multiple annular rotor rings positioned in longitudinal series with each other about the motor stator. The at least one impeller can include multiple impellers, and each annular rotor ring of the multiple of annular rotor rings can be coupled to an impeller of the multiple impellers. The motorized pump system can further include a sensor unit to measure one or more operating conditions of the motorized pump system.

Some aspects of the disclosure encompass a method for directing fluid. The method includes receiving a fluid at a fluid intake of a motorized pump system, where the motorized pump system includes a switched reluctance motor and a pump surrounding the switched reluctance motor. The switched reluctance motor includes a motor rotor and a motor stator, and the pump includes a pump rotor integrated with the motor rotor. The pump rotor includes at least one impeller connected to the motor rotor. The method also includes driving the pump of the motorized pump system with the switched reluctance motor, and directing, with the pump, the fluid out of a fluid output of the motorized pump system.

This, and other aspects, can include one or more of the following features. Driving the pump with the switched reluctance motor can include driving rotation of the at least one impeller of the pump with the switched reluctance motor. Driving the pump with the switched reluctance motor can include controlling operation of the switched reluctance motor with a motor controller including power electronics. The motor rotor can include multiple annular rotor rings positioned in longitudinal series with each other about the motor stator, and each annular rotor ring of the plurality of annular rotor rings can be coupled to an impeller of the at least one impeller to form a multistage centrifugal pump. Directing the fluid out of a fluid output can include directing fluid through the multistage centrifugal pump and out of the fluid output. The motor rotor can be positioned radially outward of the motor stator.

Certain aspects of the disclosure include a motorized pump system including a switched reluctance motor having a motor rotor and a motor stator, a pump at least partially surrounding the switched reluctance motor and including a pump rotor integrated with the motor rotor, and a motor controller with power electronics to control operation of the switched reluctance motor.

This, and other aspects, can include one or more of the following features. The pump rotor can include multiple impellers coupled to the motor rotor. The motorized pump system can further include a housing radially enclosing the pump, and the pump can include multiple diffusers positioned adjacent the multiple impellers. The pump can be a multistage centrifugal pump including multiple stages, wherein each stage includes an impeller of multiple impellers and a paired diffuser of the multiple diffusers.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
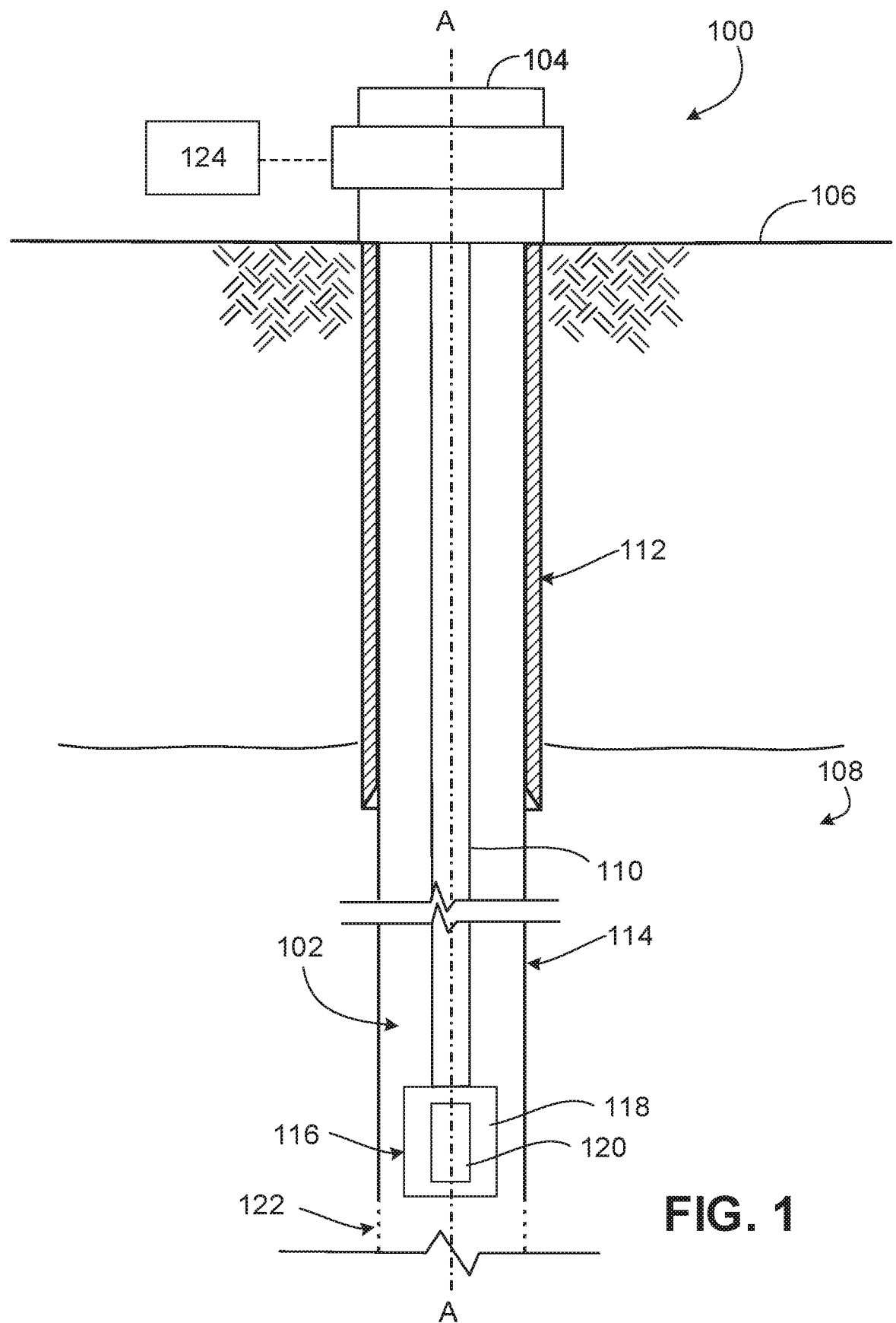
FIG. 1 is a schematic partial cross-sectional side view of an example well system with an example motorized pump system.

This disclosure describes a pumping system driven by a switched reluctance motor (SRM). In some aspects, a submersible motorized pump system includes a SRM integrally coupled to a pump, such as a multistage centrifugal pump, V-pump, positive displacement pump, progressive cavity pump, a gear rotor pump, a combination of these pumps, or another downhole electric submersible pump (ESP). The pump and the motor are integrated as one unit, called a motorized pump or a pump encapsulating a motor. The switched reluctance motor includes a motor rotor and a motor stator, and the motor rotor is positioned radially outward of the motor stator in an outer rotor orientation, such that the rotatable motor rotor rotates about the relatively stationary motor stator. In certain implementations, the motor may be designed to have an inner stator with an outer rotor, or vice versa—an outer stator with an inner rotor. In some embodiments, the motorized pump system includes the following features positioned from radially inside to radially outwards: a stationary longitudinal shaft (or hollow longitudinal bore), the motor stator with magnetic windings, the motor rotor integrated with impellers of the pump, pump diffusers, and a housing. The pump can be a multistage centrifugal pump with each stage including a pair of an impeller and a diffuser, or a pair of two impellers and one diffuser. The diffusers are made with non-magnetic material, and are stationary within the housing (relative to the impellers). The impellers are made of magnetic material or non-magnetic material, and are coupled to (for example, mechanically fixed to or integral with) and rotate with the motor rotor as the motor stator is energized with current, such as alternating current (AC). The motor is a SRM, not an induction motor (IM) or permanent magnet motor (PMM), and excludes winding, copper bars and end rings (as in an IM) and rare earth permanent magnets (as in a PMM). Among other advantages, the SRM motorized pump can reduce the construction complexity and cost of downhole pumping systems, resulting in an overall system that is simpler, more compact, cost effective, and more reliable at high speed. The motorized pump system is compact, and can be deployed with tubing using workover rigs or rigless cable deployed.

SRMs include a rotor with multiple poles, and can be beneficial in downhole applications because reliability, substantially immune to overload, and are capable of creating large torque in a short time, even at initial startup at zero revolutions per minute (RPM). Downhole motors typically require a high startup torque to get a connected pump to initially rotate; however, SRM uses current pulses to generate rotation. A stator winding of a SRM is simpler than that of IM or PMM, and the rotor of the SRM does not include copper bars, windings, or permanent magnets. Instead, the SRM rotor is made with solid or stacked magnetic materials (for example, laminated silicon steel, or cobalt-iron lamination). As the stator of the SRM is energized, magnetic poles are induced in rotor poles of the rotor, and the magnetic reluctance of the rotor creates a force that attempts to align the rotor with the powered windings of the stator. Rotation is maintained by energizing adjacent windings sequentially. The rotor has fewer poles than the stator so that the rotor poles and stator poles cannot all align simultaneously, which is a position that does not generate torque.

In a conventional pumping system, the pump and the motor are separate components, linked together with a shaft, and in typical downhole applications, having a protector or seal section sit in between for motor protection. In this disclosure, the pump and the motor are integrated as one unit. In some embodiments, radially from inside to outside, the system includes a stationary shaft, the motor stator with magnetic windings, the motor rotors integrated with the pump impellers, the pump diffuser, and the housing. The pump is a multistage centrifugal pump with each stage including a pair of an impeller and a diffuser. The diffuser is made with non-magnetic material and is stationary. The impeller is made of either magnetic material or non-magnetic material, and is integrated with and rotates with the motor rotor as the stator is energized with AC. Unlike some conventional integrated motor and pump systems, the motor of the present current disclosure is a SRM, not an IM or PMM. The elimination of copper bars and end rings as in an IM, and rare earth permanent magnets as in a PMM, reduces the system construction complexity and cost. The overall system is simpler, more compact and cost effective.

Other advantages of SRMs include a simple and rugged construction, the same or better efficiency than other electric motor types, (for example, an efficiency of over 90% across a wider range of load conditions), capable of overloading three to ten times (compared to 1.5 times for other electric motor types), and offers high speeds and high-torque density without the need for copper bars, copper windings, or permanent magnets. Also, the absence of torque-producing current flow in the motor rotor can reduce losses at the rotor. In some examples, these advantages are further realized with fast-switching power electronics.

In some examples, a motorized pump system includes a centrifugal pump, an electric motor, a sensory unit, and a power delivery cable, where the centrifugal pump and the electric motor are integrally formed into a single unit. The centrifugal pump can be used in downhole wellbore environments to lift well fluids to the surface, for example, during hydrocarbon production of a well. The motor converts electric power to mechanical power to drive the pump. The power delivery cable provides electrical power for the motor, for example, from the surface power source, such as a generator or battery. The pump can include pump stages made up of impellers and diffusers. The impellers, which rotate relative to the diffusers, add energy to the well fluid as kinetic energy; whereas the diffusers, which are stationary relative to the impellers, convert the kinetic energy of fluids into hydraulic pressure (for example, head pressure). The pump stages are typically stacked in series along a longitudinal axis to form a multi-stage pump system positioned radially within a pump housing. In some examples, the sum of the hydraulic head pressure generated by each individual stage is summative, in that the total head pressure increases from a first stage to a last stage. In some examples, a monitoring sub or tool can be positioned on the motor, for example, to measure parameters such as pump intake and discharge pressures, intake and motor temperatures and oil temperatures, vibration, a combination of these, or other parameters. Measured downhole data can be communicated to a well surface location, for example, using the power cable via a communication line adjacent or within the power cable.

FIG. 1 is a schematic partial cross-sectional view of an example well system 100 that includes a substantially cylindrical wellbore 102 extending from a well head 104 at a surface 106 downward into the Earth into one or more subterranean zones of interest 108 (one shown). The well system 100 includes a vertical well, with the wellbore 102 extending substantially vertically from the surface 106 to the subterranean zone 108. The concepts herein, however, are applicable to many other different configurations of wells, including horizontal, slanted, or otherwise deviated wells. A well string 110 is shown as having been lowered from the surface 106 into the wellbore 102. In certain instances, after some or all of the wellbore 102 is drilled, a portion of the wellbore 102 is lined with lengths of tubing, called casing 112. The wellbore 102 can be drilled in stages, and the casing 112 may be installed between stages. The casing 112 can include a series of jointed lengths of tubing coupled together end-to-end or a continuous (for example, not jointed) coiled tubing. The casing 112 forms the cased section of the wellbore 102. In some examples, the well system 100 excludes casings, such as casing 112, and the wellbore 102 is at least partially or entirely open bore. The section(s) of the wellbore 102 exposed to the adjacent formation (for example, without casing or other permanent completion) form the open hole section 114 of the wellbore 102.

In the example well system 100 of FIG. 1, the well string 110 is a production tubing string that includes an example motorized pump system 116 at a downhole end of the production tubing string. The motorized pump system 116 is shown in FIG. 1 as positioned in the wellbore 102 adjacent an open hole section 114 of the wellbore that includes perforations 122 in the formation surrounding the wellbore 102. The motorized pump system 116 pumps fluid in the wellbore 102, for example, fluid entering the wellbore 102 from the perforations 122, into the motorized pump system 116 and uphole through the production tubing string. The motorized pump system 116 is rugged enough to withstand the harsh environment of the wellbore 102, and can connect to the production tubing string with a threaded connection or other appropriate connection.

The example motorized pump system 116 includes a switched reluctance motor (SRM) 120 and a pump 118 coupled to or integrally formed with each other, and form an ESP positioned downhole in the wellbore 102. The well system 100 also includes surface equipment 124, such as an electrical transformer and motor controller. In some implementations, the system 100 also includes a variable frequency drive. The motorized pump system 116 is communicably coupled to the motor controller, for example, positioned at the surface 106 at the surface equipment 124. The surface equipment can include a power source to provide electrical power to the motor 120, and the motor controller controls the power supply to the motor 120. A power cable (not shown) can connect the surface equipment 124 to the example motorized pump system 116. The motorized pump system 116 may also include a motor lead extension in addition to the power cable. For instance, an electrical main cable and a cable motor-lead extension may connect surface equipment with the motor 120 and a well-monitoring device. A monitoring submersible tool may be installed onto the motor to measure parameters such as pump intake and discharge pressures, intake and motor oil temperature, vibration, a combination of these, or other parameters. Measured downhole data may be communicated to the surface via the power cable. In some implementations, the motor controller is positioned within the wellbore 102 proximate to or within the motorized pump system 116. In other words, the motor controller can be located locally downhole in the wellbore 102 instead of at the surface 106.

In some implementations, the well system 100 can include another type of well string 110 during another stage of well operation, where the motorized pump system 116 is disposed on this other type of well string. For example, the well system 100 can include a production well, a well being drilled, a well being cased and cemented, a well being tested, or a well during other well operations, and can include a production string, a drill string, casing tubing, a testing string, or another type of well string.

The motorized pump system 116 can be disposed at various locations on the well string 110. In some examples, the motorized pump system 116 is disposed at a downhole end of the well string 110, or disposed separate from and farther uphole of the downhole end of the well string 110, such as adjacent to the casing 112.

Figure 2:
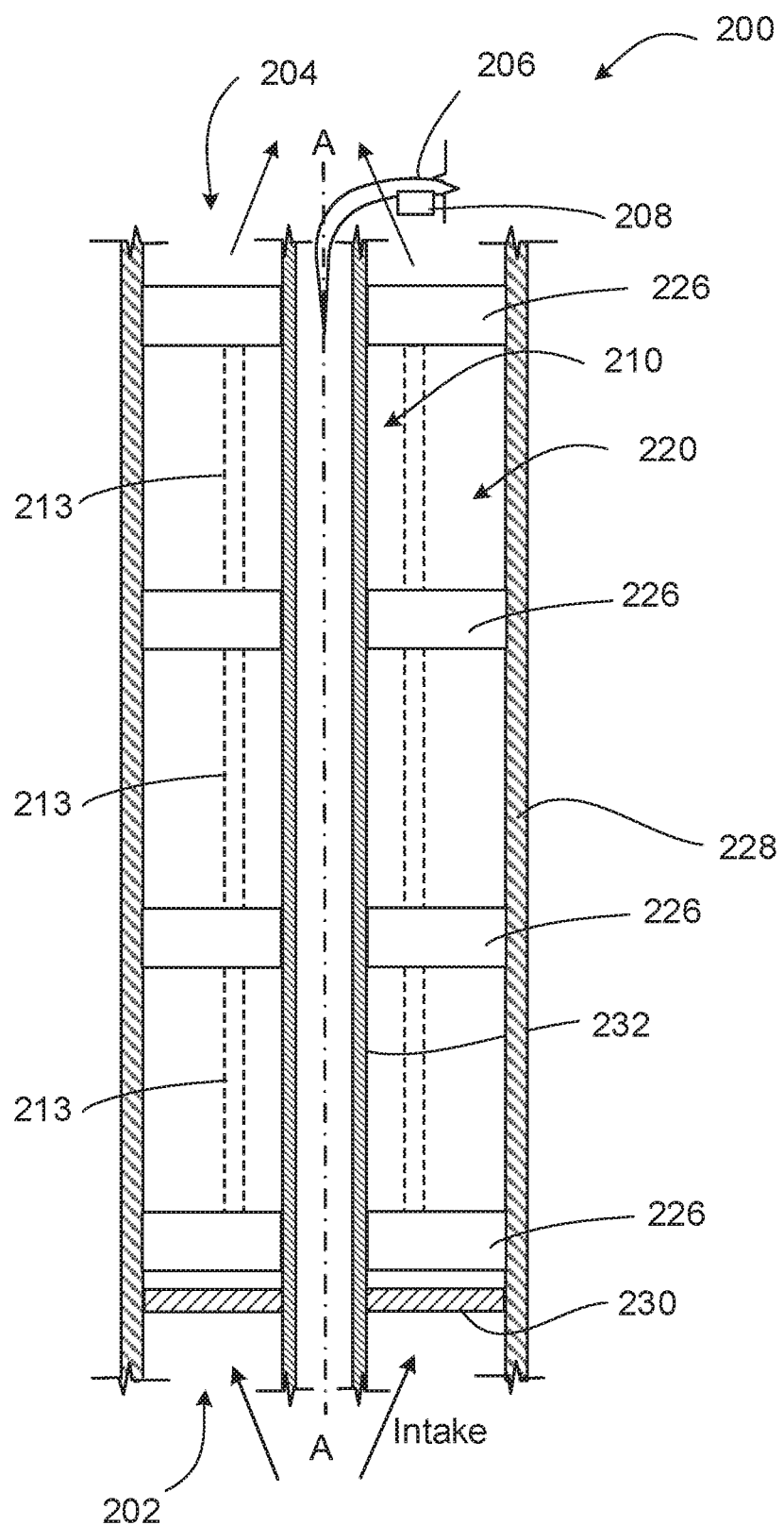
FIG. 2 is a schematic, partial cross-sectional side view of an example motorized pump system that can be used in the example well system of FIG. 1.

FIG. 2 is a schematic, cross-sectional side view of an example motorized pump system 200 including a SRM 210 and pump 220 integrated with each other. The example motorized pump system 200, SRM 210, and pump 220 can be used in the motorized pump system 116, SRM 120, and pump 118 of FIG. 1. The motorized pump system 200 can be used in the well system 100 of FIG. 1, for example, where the motorized pump system 200 is disposed on the well string 110 of FIG. 1 along longitudinal axis A-A and used to pump fluid present in the wellbore 102 in an uphole direction. The SRM 210 and pump 220 are shown schematically in FIG. 2, with some embodiments described in greater detail later (see FIGS. 3A, 3B, 4A, and 4B). The SRM 210 drives the pump 220 to direct fluid from an intake 202 to a discharge 204 of the motorized pump system 200. FIG. 2 shows the intake 202 at a bottommost, downhole longitudinal end of the system 200 and the discharge 204 at an upper, uphole longitudinal end of the system 200, though this orientation can vary, for example, based on the desired application positioning of the system 200. Electrical power is delivered to the SRM 210 with a power cable 206 and connector, for example, extending from a surface of a well in which the pump system 200 is disposed. In the example motorized pump system 200 of FIG. 2, the power cable 206 is shown as extending from an uphole location through a central bore of the SRM 210, and can electrically couple to the SRM at a radially inner surface of the SRM 210. However, the connection of the power cable 206 can be different. For example, the power cable 206 can instead connect to the SRM 210 at a longitudinal end of the SRM 210, such as a longitudinal uphole end or a longitudinal downhole end of the SRM 210, or elsewhere on the SRM 210. Control of the SRM 210 is performed by a motor controller 208 that includes high frequency power electronics connected to the SRM 210 via the power cable 206. Though FIG. 2 shows the motorized pump system 200 as deployed at the end of a tubing string, this construction can vary. For example, a pump change-out may require a workover rig, and the motorized pump system 200 can be riglessly deployed with a power cable, for example, by attaching the power cable 206 directly to SRM 210. In some instances, only the power cable 206 and the stator of the SRM 210 is riglessly retrievable, and in certain instances, the entire motorized pump system 200 is riglessly retrievable.

The motor controller 208 is communicably coupled to the SRM 210 (specifically, the motor stator of the SRM 210, described later), and can include power electronics, such as high frequency power electronics, to control operation of the SRM 210. The motor controller 208 is shown schematically in FIG. 2 as coupled to the power cable 206 and disposed local to the SRM 210. However, the location of the motor controller 208 can vary. For example, the motor controller 208 can be positioned at a remote location, such as a well surface location, or disposed in a wellbore between the surface and the SRM 210, for example, such as at a variable speed drive connected to the motorized pump system 200.

The motorized pump system 200 can be positioned adjacent to a cased hole section or an open hole section (for example, open hole section 114) of the wellbore 102 and adjacent to a zone of interest (for example, zone of interest 108) of the wellbore 102, and operates to pump fluid present in the wellbore 102 (for example, fluids entering the wellbore 102 from the formation via perforations 122) in an uphole direction.

The topology of electric motors (for example, the SRM 210) can vary. For example, electric motors can be built with inner rotors relative to outer stators, or with outer rotors relative to inner stators. Likewise, in the example motorized pump system 200 of FIG. 2, the SRM 210 can include an inner rotor with an outer stator, or an outer rotor with an inner stator. The rotating motor rotor of the SRM 210 couples to impellers of the pump 220 to drive the pump 220. The example motorized pump system 200 with the example SRM 210 and pump 220 are integrated as one combined unit, where the pump 220 radially surrounds (completely or at least in part) the SRM 210. The SRM 210 includes a motor rotor and a motor stator, where the motor rotor is positioned radially outward of the motor stator or radially inward of the motor stator, and the motor rotor couples to impellers of the pump 220. In some instances, the motor rotor can be an outer rotor (or external rotor) and the motor stator can be an inner stator (or internal stator), in that the motor rotor rotates about the relatively stationary motor stator. The motor rotor is generally cylindrical and surrounds the motor stator, which is also generally cylindrical. In certain instances, the motor rotor can be an inner rotor (or internal rotor) and the motor stator can be an outer stator (or external stator), in that the motor rotates within the stationary outer stator. The motor rotor is generally cylindrical and is surrounded by the motor stator, which is also generally cylindrical.

Figure 3A:
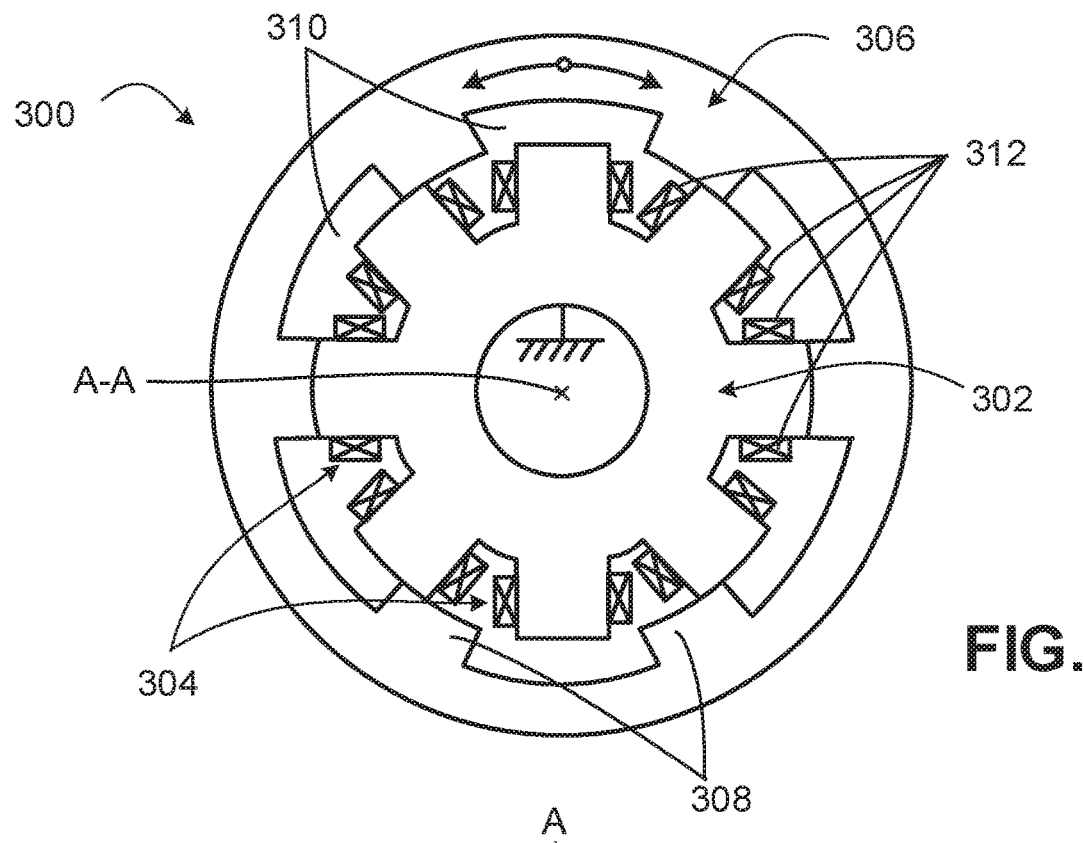
FIGS. 3A and 3B are a partial cross-sectional top view and a partial cross-sectional side view of an example outer rotor motor construction that can be implemented in the example motorized pump system of FIG. 2.
Figure 3B:
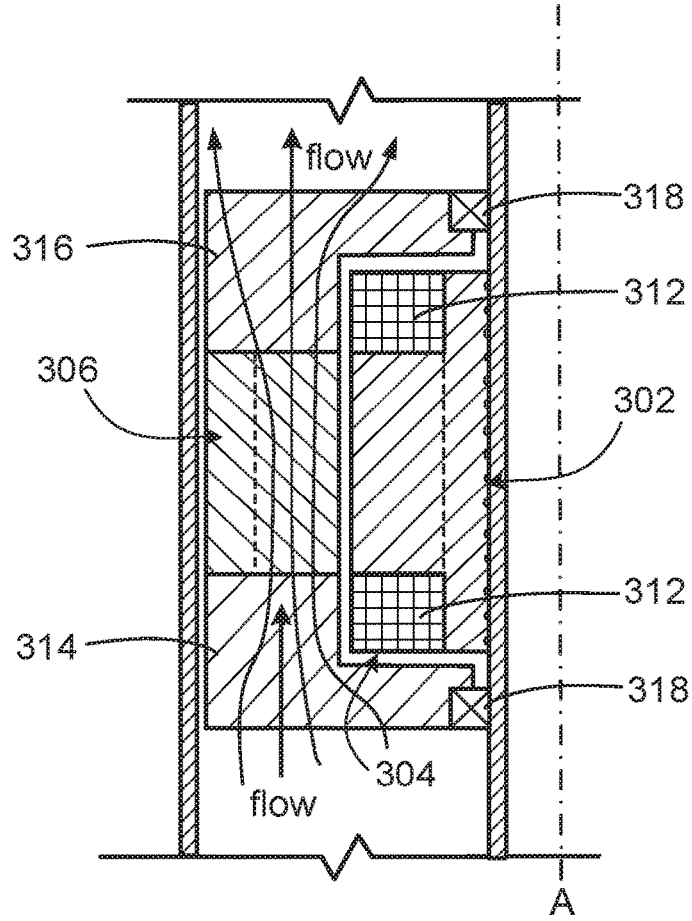

FIGS. 3A and 3B are a partial cross-sectional top view and a partial cross-sectional side view of an example outer rotor motor construction 300 that can be used in the example SRM 210 and pump 220 of the example motorized pump system 200 of FIG. 2, where the example SRM 210 and pump 220 are integrated as one combined unit. The example outer rotor motor construction 300 includes an inner stator 302 and an outer rotor 306. The inner stator 302 and outer rotor 306 can be the motor stator and motor rotor, respectively, of the SRM 210 of FIG. 2. Stator windings 304 of the stator 302, when energized, interact with rotor poles 308 of the rotor 306 to drive the rotor 306 to rotate about a longitudinal axis A-A. FIG. 3A shows eight stator winding slots 304 and six rotor poles 308, though the number of stator winding slots 304 and rotor poles 308 can be different. For example, the number of stator winding slots 304 (or stator poles) can be less than eight or greater than eight, and the number of rotor poles can be less than six or greater than six, but the number of stator winding slots 304 is larger than the number of rotor poles 308. The outer rotor motor construction 300 has the rotor 306 rotate on the radial outside of the stator 302. The example motor construction 300 can have a greater magnetic flux, resulting in higher power density and higher torque density, than an electric motor with an inner rotor and outer stator. Also, an outer rotor motor can also provide a space saving, compact design, optimum cooling, full speed controllability, low start-up currents, or a combination of these.

Referring to FIGS. 3A and 3B, the motor rotor 306 includes rotor poles 308, the motor stator 302 includes stator winding slots 304, and the rotor poles 308 are positioned radially outward of the stator winding slots 304. The rotor poles 308 are disposed on the radially inner surface of the motor rotor 306, facing the motor stator 302. In some implementations, the motor rotor 306 includes non-magnetic material in the spaces between the rotor poles 308, for example, so that the inside diameter of the motor rotor 306 is consistent and circular about its entire inner surface. This inner surface construction also minimizes the open space between the motor rotor 306 and the motor stator 302, reducing the space available for potential fluid recirculation. In certain implementations, the spaces between the rotor poles 308 are empty, and provide for a fluid flow channel 310. For example, in instances where the pump 220 biases fluid in a longitudinal direction, the fluid can flow along the fluid flow channels 310 between the rotor poles 308, even as the rotor 206 rotates during operation of the motor, such as the operation of the SRM 210.

The motor stator 302, which can be used in the example motorized pump system 200 of FIG. 2, includes a stator body and wire coils 312 about the stator body. The wire coils 312 can be wound in the winding slots 304 and about poles of the stator 302. The wire coils 312 can be energized to drive the motor rotor 306. The construction of the motor stator 302 can vary. In some examples, the stator body includes a stack of silicone steel laminations, and the wire coils 312 include magnetic windings positioned in the winding slots 304 in the stack of silicone steel laminations.

The magnetic windings can be energized, for example, with AC current to drive the motor rotor 306. The magnetic windings can be insulated wires, and are wound through the slots in the stack of silicone steel laminations. The winding patterns can vary, and the slots can be open or filled with material, such as epoxy, to seal off the slots from the ambient environment. In some implementations, the motor stator 302 is encapsulated within a sleeve of non-magnetic material, for example, to prevent, reduce, or deter corrosion of the motor stator 302 during operation. In some examples, the sleeve is a magnetic transparent material to prevent corrosion of the motor stator 302, for example, since the motor stator 302 may be exposed to a caustic ambient environment such as a wellbore environment when implemented in the system 200 of FIG. 2.

The motor rotor 306 includes magnetic material to interact with the motor stator 302. For example, the rotor poles 308 of the motor rotor 306 include magnetic material to interact with the wire coils 312 in the winding slots 304 of the motor stator 302 such that when the wire coils 312 of the stator 302 are energized, magnetic poles are induced in the rotor poles 308 of the rotor 306 and the magnetic reluctance of the rotor 306 creates a force that attempts to align the rotor poles 308 with the powered coil windings 312 of the stator 302. Rotor rotation is maintained by energizing adjacent windings 312 sequentially. As described earlier, the rotor 306 has fewer poles 308 than stator winding slots 304 of the stator 302 so that the rotor poles 308 and stator winding slots 304 cannot all align simultaneously, which is a position that does not generate torque.

The rotor 306 is made with magnetic materials, for example, either solid or machined from a compressed stack of laminated magnetic materials. The motor rotor 306 excludes copper bars, windings, or permanent magnets of any kind. In other words, the motor rotor 306 is free from permanent magnets, copper bars, and windings adjacent the motor stator 302.

In some examples of the motorized pump system 200 of FIG. 2, the motor rotor of the SRM 210 includes multiple annular rotor rings 213 positioned in longitudinal series with each other about the motor stator. In some implementations, these annular rotor rings 213 are positioned between the pump rotor of pump 220 and the motor stator of SRM 210, or are integral with the motor rotor, pump rotor, or both, and can define the multiple pump stages of pump 220. For example, each pump stage can include one annular ring 213, which bridges the motor rotor with the pump rotor of a respective stage. The annular rotor rings 213 can have an annular shape, and are stacked longitudinally along all or a portion of the longitudinal length of the SRM 210, for example, the length of the motor stator. Each of the annular rotor rings 213 can operate at the same rotational speed as the rest of the annular rotor rings 213, for example, depending on how the motor stator is energized. Each of the annular rotor rings 213 can have the same inner diameter adjacent the motor stator. For simplicity, all rotor elements can be the same between stages. In some implementations, to drive each rotor stage independently, the respective stator winding can be different, or in other words, each rotor can have its own corresponding stator. This provides flexibility, but can also create some complexity in the stator design, winding, power supply and control. The annular rotor rings 213 are stacked longitudinally, though in some instances, the annular rotor rings 213 can be separated from each other with a gap, empty spacing, or washer bearing. The rotor rings need not be coupled to each other, in that each of the annular rotor rings 213 can rotate freely regardless of the rotation of an adjacent rotor ring. In other implementations, a single long motor rotor can be designed instead of using multiple individual rotor rings. In some instances, the motorized pump system 200 excludes the annular rotor rings 213 altogether. For example, certain motor constructions of the integral SRM 210 and pump 220 include a motor rotor and pump rotor components coupled directly to each other without an annular rotor ring.

In some instances, references to motor rotor and motor stator with respect to the example SRM 210 and pump 220 of FIG. 2 can refer to the rotor 306 and stator 302, respectively, of the example motor construction 300 of FIGS. 3A and 3B. Referring to the example system 200 of FIG. 2 and the example motor construction 300 of FIGS. 3A and 3B, the pump 220 is integrated with, and in some instances, at least partially radially surrounds the SRM 210. The pump 220 includes a pump rotor mounted to, fixedly coupled to, integral with, or otherwise coupled to the motor rotor of the SRM 210, such as the rotor 306 of the example motor construction 300 of FIGS. 3A and 3B. The pump rotor includes at least one impeller positioned circumferentially about the motor rotor, and the impellers move with an adjacent portion of the rotor (for example, with an adjacent annular rotor ring). In some instances, each impeller includes multiple vanes disposed circumferentially about the pump rotor and extend radially with respect to central longitudinal axis A-A. The vanes of the impellers operate to impact fluid in the pump 220 as the impellers rotate about the longitudinal axis A-A. In the example motor construction 300 of FIGS. 3A and 3B, the pump rotor includes two impellers, an input impeller 314 and an output impeller 316, connected to the rotor 306. The input impeller 314 and output impeller 316 rotate with the rotor 306 to impact a fluid flow through the pump. The input impeller 314 and the output impeller 316 are coupled to, or integral with, the rotor 306 to form a combined rotor structure for both the motor and the pump. The input impeller 314 is positioned on a first longitudinal side (such as the downhole end) of the rotor 306, and receives a fluid flow. The output impeller 316 is positioned on a second, opposite longitudinal side (such as the uphole end) of the rotor 306, and expels the fluid flow. The fluid flow can flow through the rotor 306, for example, through the flow channels 310 between the rotor poles 308. The input impeller 314 and output impeller 316 are coupled to the rotor 306 and rotate simultaneously. The input impeller 314 and output impeller 316 can be the same, in that they provide the same fluid pressure and speed across the rotor 306, or they can be different. For example, the input impeller 314 and output impeller 316 can be optimized for certain fluid parameters of the fluid flow across a pump stage, and can be different to optimize the fluid parameter(s). The fluid parameters can include flow pressure, fluid flow speed, fluid speed of spinning around the rotor, or a combination of these. These fluid parameters can be different for the input impeller 314 and output impeller 316. In some examples, each impeller is configured to create an optimum pressure difference between an adjacent impeller (for example, from input impeller 314 to output impeller 316), and can provide a symmetrical load on the respective rotor 306, the entire motor rotor of the SRM 210, or both.

In some examples, the rotor 306, input impeller 314, and output impeller 316 can define one pump stage, where fluid flow through one pump stage leads to one or more longitudinally adjacent pump stages. In some instances, the impellers of the pump rotor include a bearing 318 between the radially innermost portion of the impeller and the motor stator or stationary central motor shaft.

Figure 4A:
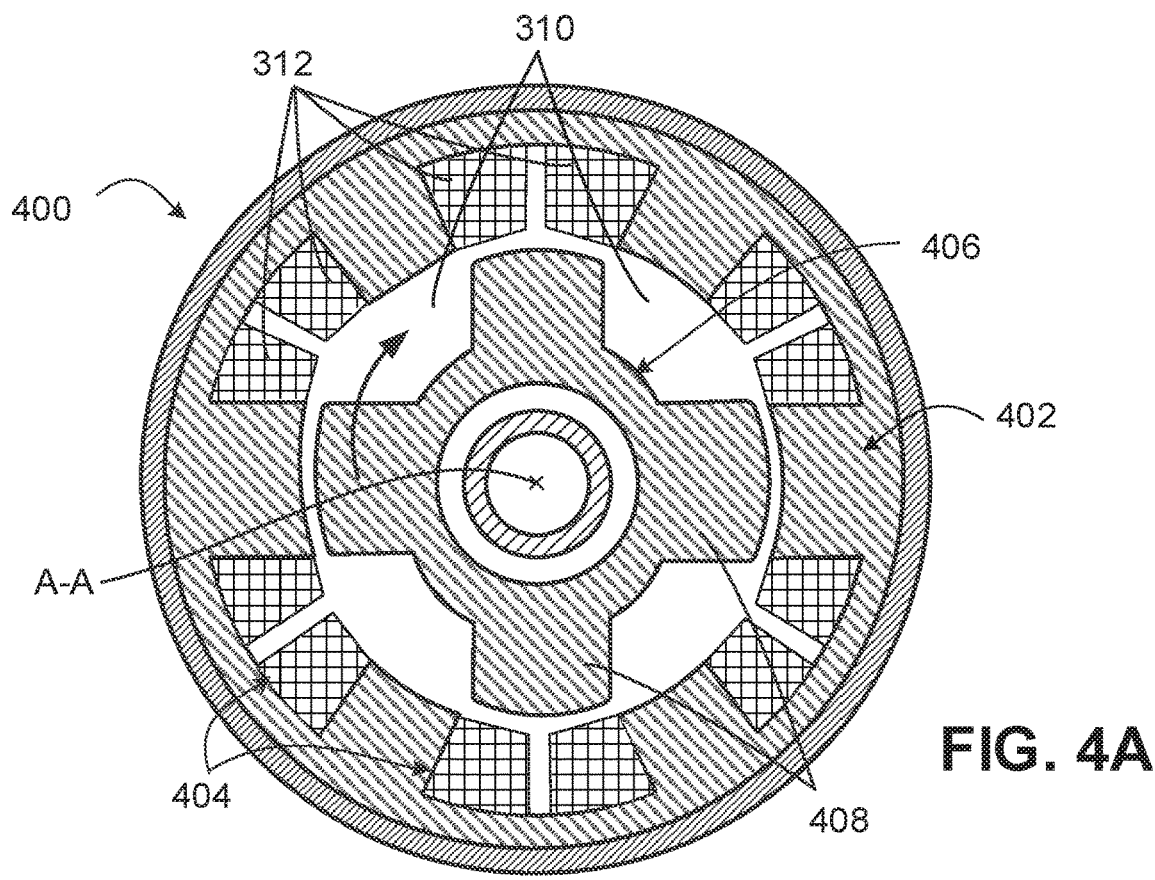
FIGS. 4A and 4B are a partial cross-sectional top view and a partial cross-sectional side view of an example inner rotor motor construction that can be implemented in an example motorized pump system.
Figure 4B:
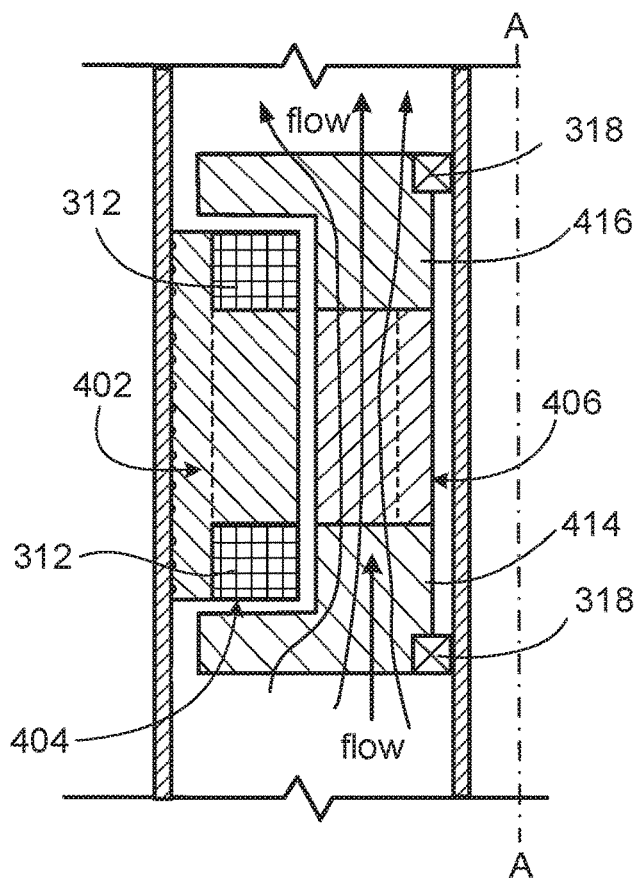

As described earlier, the topology of the SRM 210 can vary. While FIGS. 3A and 3B show an example outer rotor motor construction 300, FIGS. 4A and 4B are a partial cross-sectional top view and a partial cross-sectional side view of an example inner rotor motor construction 400 that can be used in the example SRM 210 and pump 220 of the example motorized pump system 200 of FIG. 2. The example SRM 210 and pump 220 are integrated as one combined unit, and the SRM 210 and pump 220 can include an outer rotor construction (as shown in example motor construction 300 of FIGS. 3A and 3B) or an inner rotor construction (as shown in example motor construction 400 of FIGS. 4A and 4B). The example inner rotor motor construction 400 includes an outer stator 402 and an inner rotor 406, but share certain common features with the example motor construction 300. The outer stator 402 and inner rotor 406 can be the motor stator and motor rotor, respectively, of the SRM 210 of FIG. 2. The stator 402 includes stator windings 404 (similar to stator windings 304) that, when energized, interact with rotor poles 408 (similar to rotor poles 308) of the rotor 406 to drive the rotor 406 to rotate about longitudinal axis A-A. FIG. 4A shows six stator winding slots 404 and four rotor poles 408, though the number of stator winding slots 404 and rotor poles 408 can be different. The number of stator winding slots 404 is larger than the number of rotor poles 408. The inner rotor motor construction 400 has the rotor 406 rotate on the radial inside of the stator 402, but is still coupled to an input impeller 414 (like the input impeller 314) and an output impeller 416 (like the output impeller 316), which rotate with the rotor 406 to impact a fluid flow through the pump. The fluid flow can flow through the rotor 406, for example, through the flow channels 310 between the rotor poles 408. The input impeller 414 and output impeller 416 can operate in the same way as the input impeller 314 and output impeller 316, described earlier with respect to FIG. 3B.

Referring to FIGS. 2, 3A-3B, and 4A-4B, the example system 200 with SRM 210 and pump 220 can include additional features. In some implementations, the pump 220 includes a housing 228 radially enclosing the pump 220, specifically the impellers of the pump 220, and at least one diffuser 226 positioned adjacent the impellers. The diffusers 226 are fixedly coupled to the housing 228, for example, so that the diffusers 226 are stationary relative to the impellers during operation of the pump 220. The pump 220 is shown as a multi-stage centrifugal pump, though the type of pump can vary. For example, the pump 220 can include a multi-stage centrifugal pump, V-pump, positive displacement pump, progressive cavity pump, a gear rotor pump, a combination of these pumps, or another type of ESP. In the example motorized pump system 200, the pump 220 is a multistage centrifugal pump with multiple stages, where each stage includes an impeller (or more than one impeller, such as the input impeller 314 or 414 and output impeller 316 or 416 of FIGS. 3B and 4B) and diffuser pair, where the impeller(s) of one stage is positioned longitudinally adjacent (for example, longitudinally downhole of) the paired diffuser 226. In some instances, the number of stages of the pump 220 can match the number of annular rotor rings 213 of the motor rotor, such that each annular rotor ring is coupled to one or more impellers. In some instances, the number of stages of the pump 220 is different from the number of annular rotor rings 213, for example, such that one or more or all of the annular rotor rings 213 each couple to two or more impellers. In some implementations, all stage impellers are locked into a single motor rotor.

The impellers, such as input impeller 314 and output impeller 316 of the rotor 306 of the example motor construction 300 or input impeller 414 and output impeller 416 of the rotor 406 of the example motor construction 400, can be mechanically coupled to or integral with a respective portion (for example, respective annular rotor ring) of the motor rotor, such that the impellers generally rotate about longitudinal axis A-A with the respective rotor portion and adjacent a paired, stationary diffuser 226. For example, an outer surface of the motor rotor, such as an outer surface of rotor 306 or rotor 406, can include one or more axial slots to allow one or more impellers to be coupled and locked into the rotor. The impellers can include non-magnetic or magnetic material. In instances where the impellers include magnetic material, the impellers can strengthen the magnetic field interacting with the motor rotor, which can increase a torque of the motor rotor and thereby a torque of the pump rotor. In some implementations, the motor rotor (such as rotor 306 or rotor 406) and impellers (such as input impeller 314, 414 and output impeller 316, 416) can be formed as single body from the same magnetic material, such that when the motor stator (such as stator 302 or stator 402) is energized sequentially with multiphase AC current, magnetic poles are induced in the rotor poles of the rotor, and the magnetic reluctance forces of the rotor forces the rotor and the impellers to rotate. As the impellers rotate, the impellers impact fluid in the pump 220, transferring the energy from the SRM 210 into fluid kinetic energy.

In some implementations, each impeller has a corresponding diffuser 226 disposed around and downstream of the respective impeller. The diffuser 226 brings fluids exiting the impeller to the lateral center of the pump 220 and converts the fluid kinetic energy into hydraulic pressure. From entry (intake) side to exit (discharge) side of the diffuser 226, the flow area increases. The diffuser 226 can be made of non-magnetic material, and is stationary. The diffusers 226 can be compressed together with a compression tube or spacer (not shown), and frictionally engage with the housing 228 to remain stationary. In some implementations, the diffusers 226 act as radial and thrust bearings for the impellers and motor rotor. Contact areas between the diffusers 226 and the impellers can include synthetic pads or washers (for example, laminated phenolic up-thrust and downthrust washers attached to the impellers and diffusers 226 to handle axial thrust) or coated with ceramic material to minimize erosional material loss. Thrust can be handled at each stage, and the respective impeller(s) of each stage can float between adjacent diffusers 226. In some instances, the multistage pump 220 can be a compression type, where thrust from each stage is transferred along the motor rotor sections, such as via annular rotor rings, all upthrust is handled with an upthrust bearing (not shown) at a downstream (uphole) longitudinal end of the housing 228, and all downthrust is handled with a downthrust bearing (not shown) at an upstream (downhole) longitudinal end of the housing 228.

As described earlier, the power cable 206 is connected to the motor stator of the SRM 210 to deliver and direct a current supply to the motor stator. The power cable 206 can connect a power source, communication equipment, or other equipment to the SRM 210, pump 220, or both. The power source and communication equipment may be located remotely, such as at a surface location, or locally to the motorized pump system 200. In some embodiments, the power cable 206 is connected to a top portion of the SRM 210, and can be strapped to the outside of production tubing extending from a well surface to the SRM 210, where the power cable 206 connects to a control junction box at the surface. The power cable 206 may have a metal shield to protect the cable from external damage. In some examples, a transformer may convert the electricity provided to the SRM 210 to match the voltage and amperage of the SRM 210.

In some examples, a sensor unit (such as a monitoring submersible tool, not shown) is disposed on the system 200, such as on the housing 228, to measure parameters of the SRM 210, pump 220, or both. These parameters can include operating parameters of the SRM 210, pump 220, or both, pump intake pressure, discharge pressure, intake temperature, motor winding temperature, vibration, a combination of these, or other parameters. Measured downhole data can also be communicated to the surface or other location via the power cable 206. The sensor unit or monitoring tool can be attached to the motor stator, such as stator 306, and electrically connected to the winding Y-point for power supply and data communication.

Both the motor stator and the housing 228 are stationary relative to the motor rotor and pump rotor during operation of the SRM 210 and pump 220. The housing 228 can include a support plate 230, for example, an internal flange that connects to and supports the motor stator, at one or both longitudinal ends of the housing 228. The motor stator can couple directly to the support plate 230 at one or both longitudinal ends of the motor stator, or can indirectly couple to the support plate 230. For example, the motor stator can couple directly to a central longitudinal shaft 232 that extends longitudinally within the motor stator between longitudinal ends of the housing 228, and the central longitudinal shaft 232 can couple to one or both of the support plates 230 of the housing 228. The longitudinal shaft 232 is also stationary relative to the motor rotor and pump rotor. In certain implementations, the motorized pump system 200 excludes the longitudinal shaft 232, and instead includes a hollow longitudinal bore at a center of the motor stator. In some examples, the motorized pump system 200 includes a check valve in the hollow longitudinal bore, for example, to control fluid flow through the longitudinal bore during operation of the pump 200. The check valve can prevent or reduce unwanted fluid recirculation through the longitudinal bore during operation of the pump 220, or allow a desired amount or direction of fluid flow through the hollow longitudinal bore, for example, to cool the motor stator.

The SRM 210 is encapsulated within the multi-stage centrifugal pump 220, as illustrated in FIG. 2. The motor stator is situated and supported in a lateral center of the housing 228 with the longitudinal central shaft 232 extending longitudinally along the length of the housing 228, or in instances of an inner rotor, supported in a lateral center by the housing 228. In some implementations, the stationary longitudinal shaft 232 can be excluded, or the shaft 232 can be hollow, for example, to allow well intervention tools such as logging or stimulation tools to pass longitudinally through the center of the motor stator. In some examples, a longitudinal shaft 232 that is hollow can enhance stator cooling with natural convection or forced convection of fluid passing through the shaft 232, for example, if the fluid flow is controlled and recirculation is limited but allowed within the hollow bore.

The motorized pumping system 200 allows for communication of fluid through the central bore of a well string coupled to the housing 228 on an uphole end of the housing 228. In some implementations, the motorized pumping system 200 can allow for lowering a coil tubing, wireline, communication device, a combination of these, or other components to the housing 228, through the longitudinal bore, or both.

Figure 5:
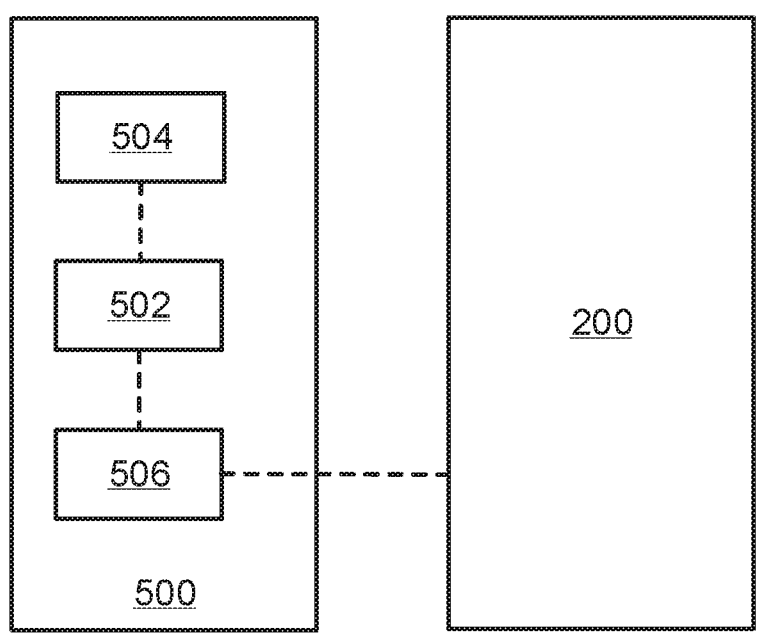
FIG. 5 is a block diagram of an example motor controller that can be used in the example motorized pump system of FIG. 2.

FIG. 5 is a block diagram of a motor controller 500 that can be used with aspects of the motorized pumping system 200 of FIG. 2. For example, the motor controller 500 can be used in the motor controller 208 of FIG. 2. The controller 500 can include one or more processors 502 and non-transitory memory 504 including instructions to facilitate sending and receiving signals through an input/output (I/O) interface 506. The controller 500 can communicate with components of the motorized pump system 200 such as, for example, the motor stator, sensors positioned about the motorized pump system 200, or other components of the motorized pump system 200. In some implementations, the controller 500 is located entirely downhole within the motorized pump system 200, entirely at a topside facility, or a combination of downhole and topside locations. For example, the controller 500 can be a distributed controller, where a portion of the controller 500 is located within or local to the motorized pump system 200, while another portion of the controller 500 is located elsewhere at a surface of the well.

Figure 6:
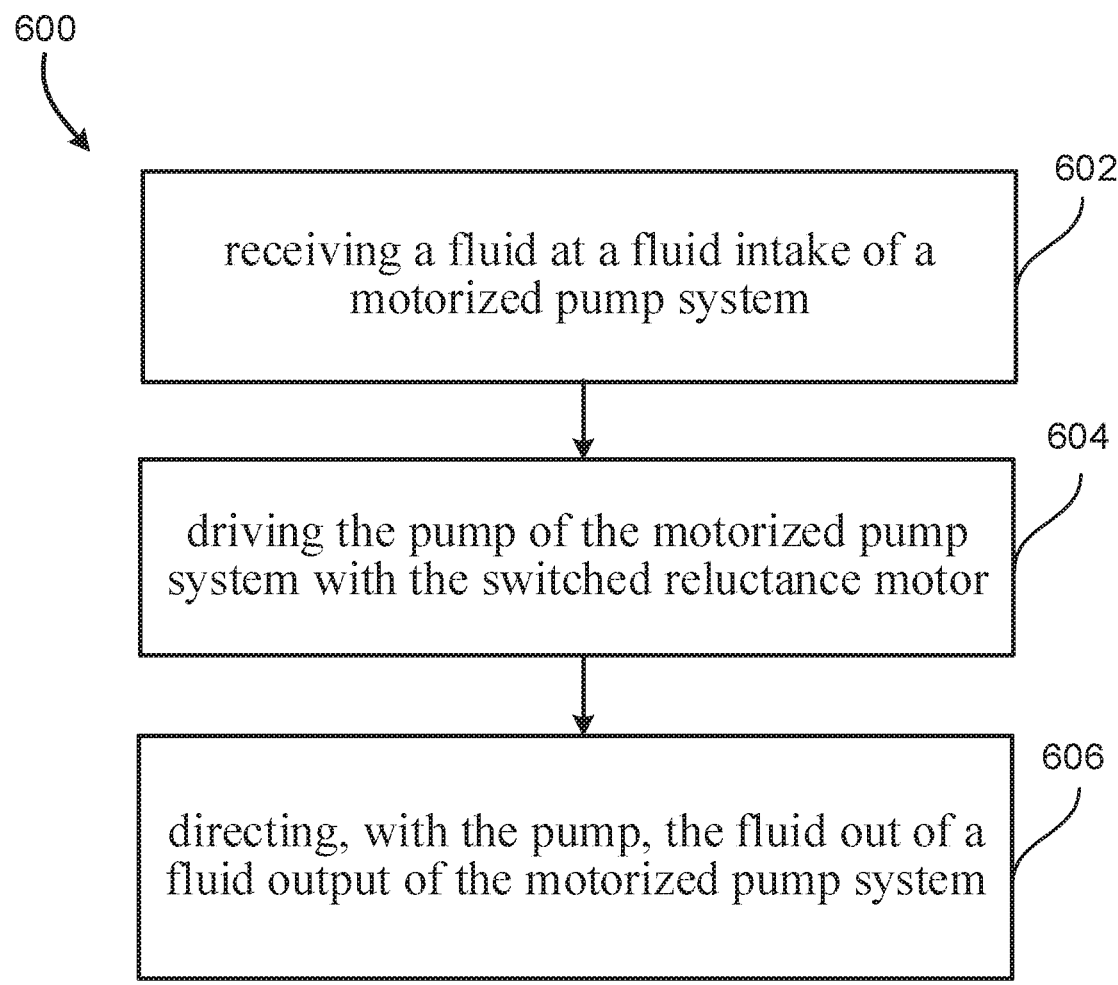
FIG. 6 is a flowchart describing an example method for directing fluid in a wellbore.

FIG. 6 is a flowchart describing and example method 600 for directing fluid, for example, performed by the example motorized pump system 200 of FIG. 2. At 602, a fluid is received at a fluid intake of a motorized pump system. The motorized pump system includes a SRM comprising a motor rotor and a motor stator, where the motor rotor positioned radially outward of the motor stator, and a pump surrounding the SRM. The pump includes a pump rotor integrated with the motor rotor, and the pump rotor includes at least one impeller positioned circumferentially about the motor rotor. At 604, the pump of the motorized pump system is driven with the SRM. At 606, the pump directs the fluid out of a fluid output of the motorized pump system. In some implementations, the SRM drives rotation of the impellers of the pump, and a motor controller controls operation of the SRM using high frequency power electronics.

Figure 7:
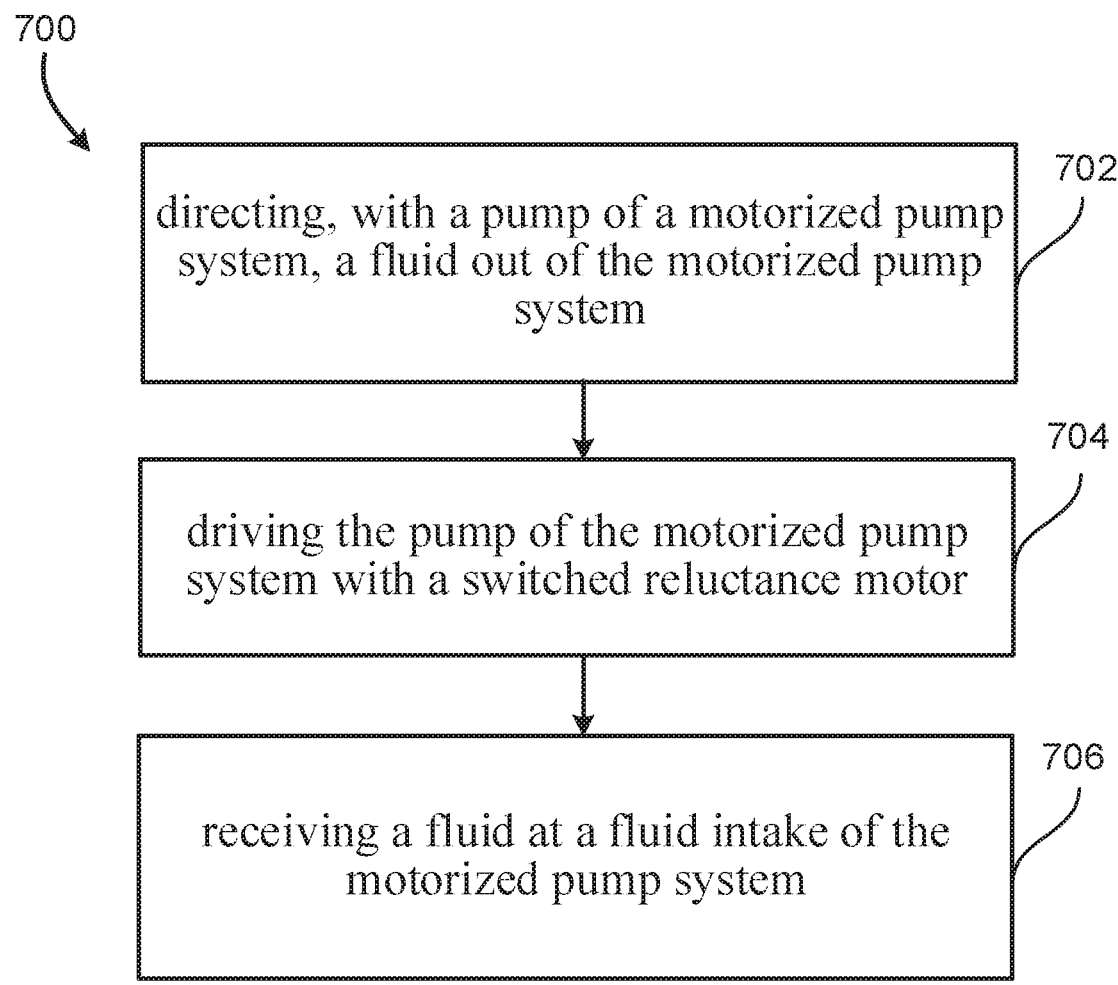
FIG. 7 is a flowchart describing an example method for directing fluid in a wellbore.

FIG. 7 is a flowchart describing another example method 700 for directing fluid, for example, performed by the example motorized pump system 200 of FIG. 2. At 702, a pump of a motorized pump system directs a fluid out of the motorized pump system. At 704, a switched reluctance motor drives the pump of the motorized pump system. At 706, a fluid intake of the motorized pump system receives a fluid, for example, from a wellbore that the motorized pump system is disposed within.

A number of implementations have been described. Nevertheless, it will be understood that various modifications may be made without departing from the spirit and scope of the disclosure.

What is claimed is:

1. A motorized pump system, comprising:
   a switched reluctance motor comprising a motor rotor and a motor stator, the motor rotor positioned radially outward of the motor stator; and
   a pump surrounding the switched reluctance motor and comprising a pump rotor integrated with the motor rotor, the pump rotor comprising at least one impeller connected to the motor rotor, the at least one impeller comprising a first input impeller and a second output impeller, the first input impeller being coupled to the motor rotor, wherein the first input impeller imparts a first pressure differential to a fluid flow through the pump, and the second output impeller imparts a second, different pressure differential to the fluid flow.

2. The motorized pump system of claim 1, wherein the motor rotor comprises rotor poles, the motor stator comprises stator poles, and the rotor poles are positioned radially outward of the stator poles.

3. The motorized pump system of claim 2, wherein spaces between the rotor poles define at least part of a fluid flow channel through the pump.

4. The motorized pump system of claim 1, comprising a longitudinal shaft positioned at a center of the motor stator, the motor stator coupled to the longitudinal shaft and configured to be substantially stationary during operation of the switched reluctance motor.

5. The motorized pump system of claim 1, comprising a longitudinal bore at a center of the motor stator.

6. The motorized pump system of claim 5, comprising a check valve in the longitudinal bore, the check valve configured to control fluid flow through the longitudinal bore.

7. The motorized pump system of claim 1, further comprising a housing radially enclosing the pump, and the pump comprises at least one diffuser positioned adjacent the at least one impeller.

8. The motorized pump system of claim 7, wherein the at least one diffuser is fixedly coupled to the housing.

9. The motorized pump system of claim 7, wherein the pump is a multistage centrifugal pump comprising a plurality of stages, wherein each stage of the plurality of stages comprises an impeller of the at least one impeller and a paired diffuser of the at least one diffuser.

10. The motorized pump system of claim 1, comprising a motor controller with power electronics configured to control operation of the switched reluctance motor.

11. The motorized pump system of claim 1, wherein the first input impeller and the second output impeller provide a symmetrical load on the motor rotor.

12. The motorized pump system of claim 1, wherein the motor rotor comprises magnetic material and is free from permanent magnets, copper bars, and windings adjacent the motor stator.

13. The motorized pump system of claim 1, wherein the motor rotor comprises a plurality of annular rotor rings positioned in longitudinal series with each other about the motor stator.

14. The motorized pump system of claim 13, wherein the at least one impeller comprises a plurality of impellers, and wherein each annular rotor ring of the plurality of annular rotor rings is coupled to an impeller of the plurality of impellers.

15. The motorized pump system of claim 1, further comprising a sensor unit configured to measure at least one operating condition of the motorized pump system.

16. A method for directing fluid, the method comprising:
receiving a fluid at a fluid intake of a motorized pump system, the motorized pump system comprising:
a switched reluctance motor comprising a motor rotor and a motor stator; and
a pump surrounding the switched reluctance motor and comprising a pump rotor integrated with the motor rotor, the pump rotor comprising at least one impeller connected to the motor rotor, the at least one impeller comprising a first input impeller and a second output impeller, the first input impeller being coupled to the motor rotor;
driving the pump of the motorized pump system with the switched reluctance motor, wherein driving the pump comprises imparting a first pressure differential to the fluid with the first input impeller and imparting a second, different pressure differential to the fluid with the second output impeller; and
directing, with the pump, the fluid out of a fluid output of the motorized pump system.

17. The method of claim 16, wherein driving the pump with the switched reluctance motor comprises driving rotation of the at least one impeller of the pump with the switched reluctance motor.

18. The method of claim 16, wherein driving the pump with the switched reluctance motor comprises controlling operation of the switched reluctance motor with a motor controller comprising power electronics.

19. The method of claim 16, wherein the motor rotor comprises a plurality of annular rotor rings positioned in longitudinal series with each other about the motor stator, each annular rotor ring of the plurality of annular rotor rings coupled to an impeller of the at least one impeller to form a multistage centrifugal pump, and wherein directing the fluid out of a fluid output comprises directing fluid through the multistage centrifugal pump and out of the fluid output.

20. The method of claim 16, wherein the motor rotor is positioned radially outward of the motor stator.

21. A motorized pump system, comprising:
a switched reluctance motor comprising a motor rotor and a motor stator;
a pump at least partially surrounding the switched reluctance motor and comprising a pump rotor integrated with the motor rotor, the pump rotor comprising a first input impeller and a second output impeller, the first input impeller being coupled to the motor rotor, wherein the first input impeller imparts a first pressure differential to a fluid flow through the pump, and the second output impeller imparts a second, different pressure differential to the fluid flow; and
a motor controller with power electronics configured to control operation of the switched reluctance motor.

22. The motorized pump system of claim 21, wherein the pump rotor comprises a plurality of impellers coupled to the motor rotor, the plurality of impellers comprising the first input impeller and the second output impeller.

23. The motorized pump system of claim 22, further comprising a housing radially enclosing the pump, and the pump comprises a plurality of diffusers positioned adjacent the plurality of impellers.

24. The motorized pump system of claim 23, wherein the pump is a multistage centrifugal pump comprising a plurality of stages, wherein each stage of the plurality of stages comprises an impeller of the plurality of impellers and a paired diffuser of the plurality of diffusers.

* * * * *